(12) United States Patent
Gao

(10) Patent No.: US 12,232,174 B2
(45) Date of Patent: Feb. 18, 2025

(54) DATA TRANSMISSION METHOD AND DEVICE

(71) Applicant: Beijing UNISOC Communications Technology Co., Ltd., Beijing (CN)

(72) Inventor: Xinghang Gao, Beijing (CN)

(73) Assignee: Beijing UNISOC Communications Technology Co., Ltd., Beijing (CN)

( * ) Notice: Subject to any disclaimer, the term of this patent is extended or adjusted under 35 U.S.C. 154(b) by 755 days.

(21) Appl. No.: 17/422,565

(22) PCT Filed: Dec. 31, 2019

(86) PCT No.: PCT/CN2019/130401
§ 371 (c)(1),
(2) Date: Dec. 10, 2021

(87) PCT Pub. No.: WO2020/147577
PCT Pub. Date: Jul. 23, 2020

(65) Prior Publication Data
US 2022/0104267 A1 Mar. 31, 2022

(30) Foreign Application Priority Data
Jan. 17, 2019 (CN) .......................... 201910044101.1

(51) Int. Cl.
*H04W 74/08* (2024.01)
*H04W 72/12* (2023.01)
(Continued)

(52) U.S. Cl.
CPC .................. *H04W 74/0833* (2013.01); *H04W 72/1268* (2013.01)

(58) Field of Classification Search
CPC ......... H04W 72/1268; H04W 72/1263; H04W 72/40; H04W 72/50; H04W 72/51;
(Continued)

(56) References Cited

U.S. PATENT DOCUMENTS

2018/0103465 A1   4/2018  Agiwal et al.
2019/0007940 A1*  1/2019  Lee ........................ H04L 5/0078
(Continued)

FOREIGN PATENT DOCUMENTS

CN        102231917 A    11/2011
CN        107889273 A     4/2018
(Continued)

OTHER PUBLICATIONS

Vilgelm, Mikhail, et al. "Latmapa: Load-Adaptive Throughput-Maximizing Preamble Allocation for Prioritization in 5G Random Access." IEEE Access, vol. 5, Jan. 10, 2017, pp. 1103-1116., https://doi.org/10.1109/access.2017.2651170.
(Continued)

*Primary Examiner* — Phong La
(74) *Attorney, Agent, or Firm* — Occhiuti & Rohlicek LLP

(57) ABSTRACT

The present disclosure relates to a data transmission method and device. Said method comprises: determining, according to resource configuration information, a preamble sequence, a physical random access channel (PRACH) time-frequency resource, a physical uplink shared channel (PUSCH) time-frequency resource set and a mapping relationship between the preamble sequence and PUSCH time-frequency resources in the PUSCH time-frequency resource set; transmitting the preamble sequence by using the PRACH time-frequency resource, and transmitting data by using a PUSCH time-frequency resource determined according to the preamble sequence and the mapping relationship; and detecting a random access response message MsgB in a random access response window. In the present disclosure, a preamble sequence and data are sent at the same time, and after the preamble sequence and the data are sent, the detection and reception of random access response informa-
(Continued)

tion MsgB to the base station can be performed, thereby realizing a random access between a terminal and the base station by means of two-step interaction, reducing the latency.

23 Claims, 10 Drawing Sheets

(51) Int. Cl.
*H04W 72/1268* (2023.01)
*H04W 74/0833* (2024.01)

(58) Field of Classification Search
CPC ............... H04W 72/512; H04W 74/08; H04W 74/0833; H04W 74/0836; H04W 74/0838; H04W 74/0866; H04W 28/08
See application file for complete search history.

(56) References Cited

U.S. PATENT DOCUMENTS

| | | | | |
|---|---|---|---|---|
| 2019/0132882 A1* | 5/2019 | Li | ..................... | H04W 74/0833 |
| 2020/0107235 A1* | 4/2020 | Peisa | ..................... | H04W 76/11 |
| 2020/0107277 A1* | 4/2020 | Jeon | ..................... | H04W 52/228 |
| 2020/0146055 A1* | 5/2020 | Lei | ..................... | H04J 11/0023 |
| 2020/0221499 A1* | 7/2020 | Hofström | .......... | H04W 72/0453 |
| 2020/0288503 A1* | 9/2020 | Sahlin | .................... | H04L 5/0053 |
| 2020/0337044 A1* | 10/2020 | Lee | ..................... | H04W 72/21 |
| 2020/0359426 A1* | 11/2020 | Pan | ..................... | H04W 74/0833 |
| 2020/0374730 A1* | 11/2020 | Gao | ..................... | H04L 5/0057 |
| 2021/0058947 A1* | 2/2021 | Lin | ..................... | H04W 72/1268 |
| 2021/0345424 A1* | 11/2021 | Cirik | ................ | H04W 72/1263 |
| 2022/0104267 A1* | 3/2022 | Gao | .................. | H04W 72/1268 |

FOREIGN PATENT DOCUMENTS

| | | | | |
|---|---|---|---|---|
| CN | 108631971 A | | 10/2018 | |
| CN | 108781463 A | | 11/2018 | |
| KR | 20180134305 A | | 12/2018 | |
| TW | 201401908 A * | | 1/2014 | ........... H04L 1/0046 |
| WO | 2016048044 A1 | | 3/2016 | |
| WO | 2018031869 A1 | | 2/2018 | |
| WO | WO-2018031623 A1 * | | 2/2018 | |
| WO | 2018085205 A1 | | 5/2018 | |
| WO | 2018133437 A1 | | 7/2018 | |
| WO | WO-2018139575 A1 * | | 8/2018 | ........... H04W 72/042 |
| WO | 2018175809 A1 | | 9/2018 | |
| WO | 2018226054 A1 | | 12/2018 | |

OTHER PUBLICATIONS

InterDigital Communications "Reciprocity-based UL Beamformed Transmit Diversity" Jan. 2017.
ZTE Microelectronics "Consideration on the two-step RACH in NR" Jan. 2017.
Feng, Chuan, and Xiao-wen Li. Implementation of LTE System Random Access Procedure. Telecommunication Engineering, vol. 50, No. 9, Sep. 2010, pp. 78-81.
Chinese Office Action, dated Jan. 5, 2022 (11 pages).
"2-Step RACH Procedure" InterDigital, 3G99 TSG-RAN WG2 Meeting #103bis, R2-1814008, Sep. 27, 2018.
Chinese Office Action, dated Jun. 10, 2022 (11 Pages).
Nokia, Nokia Shanghai Bell, "On 2-step Random Access Procedure" [online], 3GPP TSG RAN WG1 adhoc_NR_AH_1901 R1 1901192, Internet<URL:http://www.3gpp.org/ftp/tsg_ran/WG1_RL1/TSGR1_AH/NR_AH_1901/Docs/R1 / 1901192.zip>, 2019.
Samsung, "Discussion on transmission in preconfigured UL resources for NB / IOT", [online], 3GPP TSG RAN WG1 #95 R1-1812947, Internet <URL:http://www.3gpp.org/ftp/tsg_ran/WG1_RL1/TSGR1_95/Docs/R1/1812947.zip>, 2018.
LG Electronics, "Consideration on RACH procedure in NR" [online], 3GPPTSG RAN WG1 #86b R1 / 1609267, Internet<URL:http://www.3gpp.org/ftp/tsg_ran/WG1_RL1/TSGR1_86b/Docs/R1, Oct. 1, 2015 1609267.zip>, 2016.
Ericsson, "Code Block Segmentation" [online],3GPP TSG RAN WG1 #89 R1 / 1707065, Internet<URL:http://www.3gpp.org/ftp/tsg_ran/WG1_RL1/TSGR1_89/Docs/R1-1707065.zip>, 2017.
Japanese Office Action, dated Oct. 3, 2022 (11 Pages).
LG Electronics Inc., "Considerations on 2-Step CBRA procedure for NR-U SA, R2-1809940," 3GPP TSG-RAN WG2 #AH-1807, pp. 1-3, Jul. 6, 2018.
Ericsson, "NR two-step random access procedure, R1-1700300," 3GPP TSG-RAN WGl NR adhoc, pp. 1-4, Jan. 20, 2017.
R1-1901192—On 2-step Random Access Procedure, 3GPP TSG RAN WG1 Ad-Hoc Meeting 1901 Taipei, Taiwan, Jan. 21-25, 2019 (7 pages).
R1-1609267—Consideration on RACH procedure in NR, 3GPP TSG RAN WG1 Meeting #86bis, Lisbon, Portugal, Oct. 10-14, 2016 (5 pages).
R1-1707065—Code Block Segmentation, 3GPP TSG RAN WG1 Meeting #89, Hangzhou, P.R. China, May 15-19, 2017 (4 pages).

* cited by examiner

DATA TRANSMISSION METHOD AND DEVICE

TECHNICAL FIELD

The present disclosure relates to the technical field of communications, and in particular to a data transmission method and device.

BACKGROUND

The rapid development in the information industry, especially the growing demands from mobile Internet and IoT (Internet of Things), has posed unprecedented challenges to the mobile communication technology in the future. Predictably, the number of IoT equipment to be connected will become even more staggering as a huge number of IoT equipment gradually penetrates the mobile communication network. To meet those unprecedented challenges, the communications industry and the academic circles have embarked on extensive research into the Fifth Generation mobile communication technology (5G NR).

IoT equipment requires a base station to be connected, and after completing a cell search and achieving downlink synchronization, IoT equipment needs to perform uplink synchronization or transmit data. This process is usually referred to as a random access process.

In the related art, NR realizes random access by the following steps:

step 1: a terminal sends a random access preamble (Msg1) to a base station;

step 2: the base station returns a random access response (Msg2) to the terminal;

step 3: the terminal sends a message 3 (Msg3) to the base station; and step 4: the base station sends a competition resolution message (Msg4) to the terminal.

However, in the related art, the terminal and the base station have to interact for 4 steps in order to complete the random access process, which is too long for terminals sensitive to latency.

The 3GPP Working Groups proposed 2-step interaction between the terminal and the base station to complete the random access process. In this process, the uplink message is defined as MsgA, comprising at least the content of Msg1 and Msg3 from the original 4 steps, and the downlink message is defined as MsgB, comprising at least the content of Msg2 and Msg4 from the original 4 steps. Hence, how to transmit the MsgA data is an urgent problem to be settled.

SUMMARY

According to one aspect of the present disclosure, there is proposed a data transmission method applicable to a terminal, the method comprising:

determining, based on resource configuration information, a preamble sequence, a physical random access channel PRACH time-frequency resource, a physical uplink shared channel PUSCH time-frequency resource set, and a mapping relationship between the preamble sequence and PUSCH time-frequency resources in the PUSCH time-frequency resource set;

transmitting the preamble sequence by using the PRACH time-frequency resource, and transmitting data by using a PUSCH time-frequency resource determined from the preamble sequence and the mapping relationship; and detecting a random access response message MsgB in a random access response window.

In a possible embodiment, the PUSCH time-frequency resource set includes a PUSCH time domain resource set and a PUSCH frequency domain resource set, and determining, based on the resource configuration information, the preamble sequence, the physical random access channel PRACH time-frequency resource, the physical uplink shared channel PUSCH time-frequency resource set, and the mapping relationship between the preamble sequence and the PUSCH time-frequency resources in the PUSCH time-frequency resource set comprises:

determining the PUSCH time domain resource set; and
determining the PUSCH frequency domain resource set.

In a possible embodiment, determining the PUSCH time domain resource set comprises:

determining a starting slot and a starting time domain symbol of the PUSCH time domain resource set; and
determining an ending slot and an ending time domain symbol of the PUSCH time domain resource set.

In a possible embodiment, determining the starting slot and the starting time domain symbol of the PUSCH time domain resource set comprises:

determining a slot where a last time domain symbol of time domain resources in the PRACH time-frequency resource is located as the starting slot, and determining a last time domain symbol of time domain resources in the PRACH time-frequency resource as the starting time domain symbol.

In a possible embodiment, the resource configuration information includes length of PUSCH time domain resources and a number of consecutively occupied time domains, and determining the starting slot and the starting time domain symbol of the PUSCH time domain resource set further comprises:

determining a slot where a first time domain symbol of time domain resources in the PRACH time-frequency resource is located as the ending slot, and determining a first time domain symbol of time domain resources in the PRACH time-frequency resource as the ending time domain symbol; and determining the starting slot based on the length and the number of consecutively occupied time domains of the PUSCH time domain resources, and the ending slot; and determining the starting time domain symbol according to the length and the number of consecutively occupied time domains of the PUSCH time domain resources, and the ending time domain symbol.

In a possible embodiment, the resource configuration information includes slot offset and starting symbol indexes, and determining the starting slot and the starting time domain symbol of the PUSCH time domain resource set further comprises:

determining the starting slot of the PUSCH time domain resource according to the slot where a last time domain symbol of the time domain sources in the PRACH time-frequency resources is located and the slot offset, and determining the starting time domain symbol in the starting slot according to the starting symbol indexes.

In a possible embodiment, the resource configuration information includes starting symbol indexes, and determining the starting slot and the starting time domain symbol of the PUSCH time domain resource set further comprises:

determining, as the starting slot, an uplink slot adjacent to a slot where a last slot symbol of the time domain sources in the PRACH time-frequency resources is located, and determining the starting time domain symbol in the starting slot according to the starting symbol indexes.

In a possible embodiment, the resource configuration information includes a number of interval slots and starting symbol indexes, and determining the starting slot and the starting time domain symbol of the PUSCH time domain resource set further comprises:

determining, as the starting slot, a slot offset by the number of interval slots from a slot where a last slot symbol of the time domain sources in the PRACH time-frequency resources is located, and determining the starting time domain symbol in the starting slot according to the starting symbol indexes.

In a possible embodiment, the resource configuration information includes starting symbol indexes, and determining the starting slot and the starting time domain symbol of the PUSCH time domain resource set further comprises:

determining, as the starting slot, a slot where the ending symbol of the PUSCH time domain resource set corresponding to a former of adjacent PRACH time domain sources in a same slot, using the ending symbol of the PUSCH time domain resource set as the starting time domain symbol, or determining the starting time domain symbol according to the starting symbol indexes and the ending symbol of the PUSCH time domain resource set.

In a possible embodiment, the resource configuration information further includes PUSCH time domain resource length and a number of consecutively occupied time domains throughout the PUSCH time domain resource length, and determining the ending slot and the ending time domain symbol of the PUSCH time domain resource set comprises:

determining the ending slot and the ending time domain symbol of the time domain resource set according to the starting slot, the starting time domain symbol, and the PUSCH time domain resource length, and the number of consecutively occupied time domains throughout the PUSCH time domain resource length.

In a possible embodiment, the resource configuration information further includes at least one of a number of the preamble sequences, length and a number of consecutively occupied frequency domains of the PUSCH frequency domain resource, and PUSCH time domain resource length, and determining the ending slot and the ending time domain symbol of the PUSCH time domain resource set comprises:

determining the ending slot and the ending time domain symbol according to at least one of the number of the preamble sequences, the length and the number of consecutively occupied frequency domains of the PUSCH frequency domain resource, the PUSCH time domain resource length, and a mapping relationship between preamble sequences in a preamble sequence set and PUSCH time-frequency resources in the PUSCH time-frequency resource set.

In a possible embodiment, determining the PUSCH frequency domain resource set comprises:

determining a starting position of the PUSCH frequency domain resource set; and determining an ending position of the PUSCH frequency domain resource set.

In a possible embodiment, the resource configuration information includes frequency domain offset and/or frequency domain reference points, and determining the starting position of the PUSCH frequency domain resource set comprises:

determining the starting position of the PUSCH frequency domain resource set according to a frequency domain starting position or a frequency domain ending position of the PRACH frequency domain resource set, or the frequency domain reference points, and the frequency domain offset.

In a possible embodiment, determining the starting position of the PUSCH frequency domain resource set comprises:

determining the ending position of the PUSCH frequency domain resource set corresponding to a former of adjacent frequency domains as a starting position of a PUSCH frequency domain resource set corresponding to a latter of the adjacent frequency domains.

In a possible embodiment, the resource configuration information includes at least one of a number of preamble sequences, length of the PUSCH frequency domain resources, and a number of consecutively occupied time domains throughout the PUSCH time domain resource length, and determining the ending position of the PUSCH frequency domain resource set comprises:

determining the ending position of the PUSCH frequency domain resource set according to at least one of the starting position of the PUSCH frequency domain resource set, the number of the preamble sequences, the PUSCH frequency domain resource length, the number of consecutively occupied time domains throughout the PUSCH time domain resource length, and the mapping relationship.

In a possible embodiment, the resource configuration information further includes length of the PUSCH frequency domain resources, a number of consecutively occupied frequency domains throughout the PUSCH frequency domain resource length, and a number of the PRACH frequency domain resources, and determining the ending position of the PUSCH frequency domain resource set comprises:

determining an ending position of a total PUSCH frequency domain resource set comprising a plurality of the PUSCH frequency domain resource sets according to the length of the PUSCH frequency domain resources, and the number of consecutively occupied frequency domains throughout the length of the PUSCH frequency domain resources.

In a possible embodiment, the resource configuration information includes at least one of a number of preamble sequences, length of the PUSCH frequency domain resources, and length of the PUSCH time domain resources, and a number of consecutively occupied time domains, and determining the ending position of the PUSCH frequency domain resource set comprises:

determining an ending position of a total PUSCH frequency domain resource set comprising a plurality of the PUSCH frequency domain resource sets according to at least one of the starting position of the PUSCH frequency domain resource set, the number of the preamble sequences, the PUSCH frequency domain resource length, the PUSCH time domain resource length, and the number of consecutively occupied time domains throughout the PUSCH time domain resource length, and the mapping relationship, as well as the number of the PRACH frequency domain resources.

In a possible embodiment, the resource configuration information further includes an association between a beam and the PRACH time-frequency resource, and determining the PUSCH frequency domain resource set further comprises:

determining the PRACH time-frequency resource according to a selected beam and the association; and determining the PUSCH frequency domain resource set according to the time-frequency resource and the mapping relationship.

In a possible embodiment, the resource configuration information includes a preamble sequence set, and the mapping relationship comprises:

a one-to-one mapping relationship between a preamble sequence in the preamble sequence set and a PUSCH time-frequency resource in the PUSCH time-frequency resource set; or a one-to-many mapping relationship between a preamble sequence in the preamble sequence set and a plurality of PUSCH time-frequency resources in the PUSCH time-frequency resource set; or a many-to-one mapping relationship between a plurality of preamble sequences in the preamble sequence set and a PUSCH time-frequency resource in the PUSCH time-frequency resource set.

In a possible embodiment, the resource configuration information includes a mapping number parameter between preamble sequences and the PUSCH time-frequency resources, and further includes:

a one-to-one mapping relationship between a preamble sequence in the preamble sequence set and a PUSCH time-frequency resource in the PUSCH time-frequency resource set, in a case where the mapping number is a first preset value; or a one-to-many mapping relationship between a preamble sequence in the preamble sequence set and a plurality of PUSCH time-frequency resources in the PUSCH time-frequency resource set, or a many-to-one mapping relationship between a plurality of preamble sequences in the preamble sequence set and a PUSCH time-frequency resource in the PUSCH time-frequency resource set, in a case where the mapping number is not the first preset value.

In a possible embodiment, the first preset value is 1.

In a possible embodiment, the mapping relationship further comprises:

a mapping relationship between the preamble sequences in the preamble sequence set and the PUSCH time-frequency resources in the PUSCH time-frequency resource set, where a direction of time domain resources precedes over a direction of frequency domain resources; or a mapping relationship between the preamble sequences in the preamble sequence set and the PUSCH time-frequency resources in the PUSCH time-frequency resource set, where a direction of frequency domain resources precedes over a direction of time domain resources.

In a possible embodiment, transmitting the data by using the PUSCH time-frequency resource determined from the preamble sequence and the mapping relationship comprises:

randomly choosing one of the plurality of PUSCH time-frequency resources to transmit the data when the mapping relationship indicates a one-to-many mapping relationship between the preamble sequence and a plurality of PUSCH time-frequency resources.

In a possible embodiment, the method further comprises:

receiving a system message or dedicated radio resource control RRC signaling, the system message or the RRC signaling including the resource configuration information.

In a possible embodiment, the method further comprises:

acquiring the resource configuration information via a predefined table row index.

In a possible embodiment, detecting the random access response message MsgB in the random access response window comprises:

starting the random access response window in a slot where a first available PDCCH detection resource is located after transmission of the preamble sequence and the data, and receiving the random access response message MsgB in the random access response window.

According to another aspect of the present disclosure, there is proposed a data transmission method applicable to a base station, the method comprising:

establishing resource configuration information including at least one of preamble sequences, physical random access channel PRACH time-frequency resources, a physical uplink shared channel PUSCH time-frequency resource set, and a mapping relationship between the preamble sequences and PUSCH time-frequency resources in the PUSCH time-frequency resource set, and configured to allocate transmission resources; and sending the resource configuration information.

In a possible embodiment, the PUSCH time-frequency resource set includes a PUSCH time domain resource set and a PUSCH frequency domain resource set, and the resource configuration information includes at least one of a starting slot, a starting time domain symbol, slot offset, a starting symbol index, and a number of interval slots of the PUSCH time domain resource set, length and a number of consecutively occupied time domains of a PUSCH time domain resource corresponding to each preamble sequence, a number of preamble sequences in the preamble sequence set, length and a number of consecutively occupied frequency domains of the PUSCH frequency domain resource, a number of PRACH frequency domain resources, and the mapping relationship, and is configured to allocate the PUSCH time domain resource set and/or the PUSCH frequency domain resource set.

In a possible embodiment, the mapping relationship comprises:

a one-to-one mapping relationship between a preamble sequence in the preamble sequence set and a PUSCH time-frequency resource in the PUSCH time-frequency resource set; or a one-to-many mapping relationship between a preamble sequence in the preamble sequence set and a plurality of PUSCH time-frequency resources in the PUSCH time-frequency resource set; or a many-to-one mapping relationship between a plurality of preamble sequences in the preamble sequence set and a PUSCH time-frequency resource in the PUSCH time-frequency resource set.

In a possible embodiment, the resource configuration information includes a mapping number parameter, and further includes:

a one-to-one mapping relationship between a preamble sequence in the preamble sequence set and a PUSCH time-frequency resource in the PUSCH time-frequency resource set, in a case where the mapping number is a first preset value; or a one-to-many mapping relationship between a preamble sequence in the preamble sequence set and a plurality of PUSCH time-frequency resources in the PUSCH time-frequency resource set, or a many-to-one mapping relationship between a plurality of preamble sequences in the preamble sequence set and a PUSCH time-frequency resource in the PUSCH time-frequency resource set, in a case where the mapping number is not the first preset value.

In a possible embodiment, the first preset value is 1.

In a possible embodiment, the PUSCH time-frequency resource set includes a time domain resource set and a frequency domain resource set, and the mapping relationship further comprises:

a mapping relationship between the preamble sequences in the preamble sequence set and the PUSCH time-frequency resources in the PUSCH time-frequency resource set, where a direction of time domain resources precedes over a direction of frequency domain resources; or a mapping relationship between the preamble sequences in the preamble sequence set and the PUSCH time-frequency resources in the PUSCH time-frequency resource set, where a direction of frequency domain resources precedes over a direction of time domain resources.

In a possible embodiment, sending the resource configuration information comprises:

sending a system message or dedicated radio resource control RRC signaling, the system message or the RRC signaling including the resource configuration information.

In a possible embodiment, sending the resource configuration information further comprises:

sending the resource configuration information via a predefined table.

In a possible embodiment, the method further comprises:

detecting PRACH time-frequency resources in a physical random channel, and acquiring preamble sequences in the PRACH time-frequency resources;

acquiring PUSCH time-frequency resources corresponding to the preamble sequences according to the mapping relationship; and acquiring data in the PUSCH time-frequency resources.

In a possible embodiment, the method further comprises:

sending a random access response message MsgB in a random access response window after receiving the preamble sequences and the data in the PUSCH time-frequency resources.

According to another aspect of the present disclosure, there is proposed a data transmission device applicable to a terminal, the device comprising:

a first determining module, configured to determine, according to resource configuration information, a preamble sequence, a physical random access channel PRACH time-frequency resource, a physical uplink shared channel PUSCH time-frequency resource set, and a mapping relationship between the preamble sequence and PUSCH time-frequency resources in the PUSCH time-frequency resource set;

a first transmission module, connected to the first determining module and configured to transmit the preamble sequence by using the PRACH time-frequency resource, and transmit data by using a PUSCH time-frequency resource determined from the preamble sequence and the mapping relationship; and a first detection module, connected to the first transmission module and configured to detect a random access response message MsgB in a random access response window.

According to another aspect of the present disclosure, there is proposed a data transmission device applicable to a base station, the device comprising:

an establishing module, configured to establish resource configuration information including at least one of preamble sequences, physical random access channel PRACH time-frequency resources, a physical uplink shared channel PUSCH time-frequency resource set, and a mapping relationship between the preamble sequences and PUSCH time-frequency resources in the PUSCH time-frequency resource set, and configured to allocate transmission resources; and a second transmission module, connected to the establishing module and configured to send the resource configuration information.

In a possible embodiment, the PUSCH time-frequency resource set includes a PUSCH time domain resource set and a PUSCH frequency domain resource set, and the resource configuration information includes at least one of a starting slot, a starting time domain symbol, slot offset, a starting symbol index, and a number of interval slots of the PUSCH time domain resource set, length and a number of consecutively occupied time domains of a PUSCH time domain resource corresponding to each preamble sequence, a number of preamble sequences in the preamble sequence set, length and a number of consecutively occupied frequency domains of the PUSCH frequency domain resource, a number of PRACH frequency domain resources, and the mapping relationship, and is configured to allocate the PUSCH time domain resource set and/or the PUSCH frequency domain resource set.

In a possible embodiment, the device further comprises:

a second detection module, configured to detect PRACH time-frequency resources in a physical random channel, and acquire preamble sequences in the PRACH time-frequency resources;

a first acquisition module, connected to the second detection module and configured to acquire PUSCH time-frequency resources corresponding to the preamble sequences according to the mapping relationship;

a second acquisition module, connected to the first acquisition module and configured to acquire data in the PUSCH time-frequency resources; and a third transmission module, connected to the second acquisition module and configured to send a random access response message MsgB in a random access response window after receiving the preamble sequences and the data in the PUSCH time-frequency resources.

According to another aspect of the present disclosure, there is proposed a data transmission device comprising a process; and a memory configured to store instructions executable by the processor, wherein the processor is configured to execute the afore-described methods.

According to another aspect of the present disclosure, there is proposed a non-volatile computer readable storage medium having computer program instructions stored thereon, wherein the computer program instructions, when executed by a processor, implement the above-mentioned methods.

With the aforementioned methods, the present disclosure can, after obtaining resource configuration information from the base station, parse the resource configuration information, thereby determining, according to the parsed information, the preamble sequence used by the terminal for the random access, PRACH time-frequency resources for sending the preamble sequences, a PUSCH time-frequency resource set for sending data, and mapping relationships between preamble sequences in the preamble sequence set and PUSCH time-frequency resources in the PUSCH time-frequency resource set. Moreover, the present disclosure can determine the PUSCH time-frequency resources for sending data according to the preamble sequences determined by the terminal and the mapping relationships, then send the preamble sequences by using the determined PRACH time-frequency resources while sending the data by using the PUSCH time-frequency resources, and detect the random access response message MsgB from the base station in the random access response window. The present disclosure may send the preamble sequences and the data at the same time, and afterwards detect and receive the random access response message MsgB from the base station, such that the terminal may interact with the base station in two steps to achieve random access with reduced latency. Besides, depending upon the mapping relationships between the preamble sequences and the PUSCH time-frequency resources, the base station can acquire the PUSCH time-frequency resources for sending data by the terminal according to the received preamble sequences and the mapping relationships, and acquire the information sent from the terminal by using the PUSCH time-frequency resources. In this manner, the number of interactions between the terminal and the base station is reduced.

Additional features and aspects of the present disclosure will become apparent from the following detailed description of exemplary embodiments with reference to the attached drawings.

BRIEF DESCRIPTION OF THE DRAWINGS

The drawings, which are incorporated in and constitute part of the specification, show the exemplary embodiments, features and aspects of the present disclosure, and are used to explain the principle of the present disclosure together with the specification.

DETAILED DESCRIPTION

Figure 1:
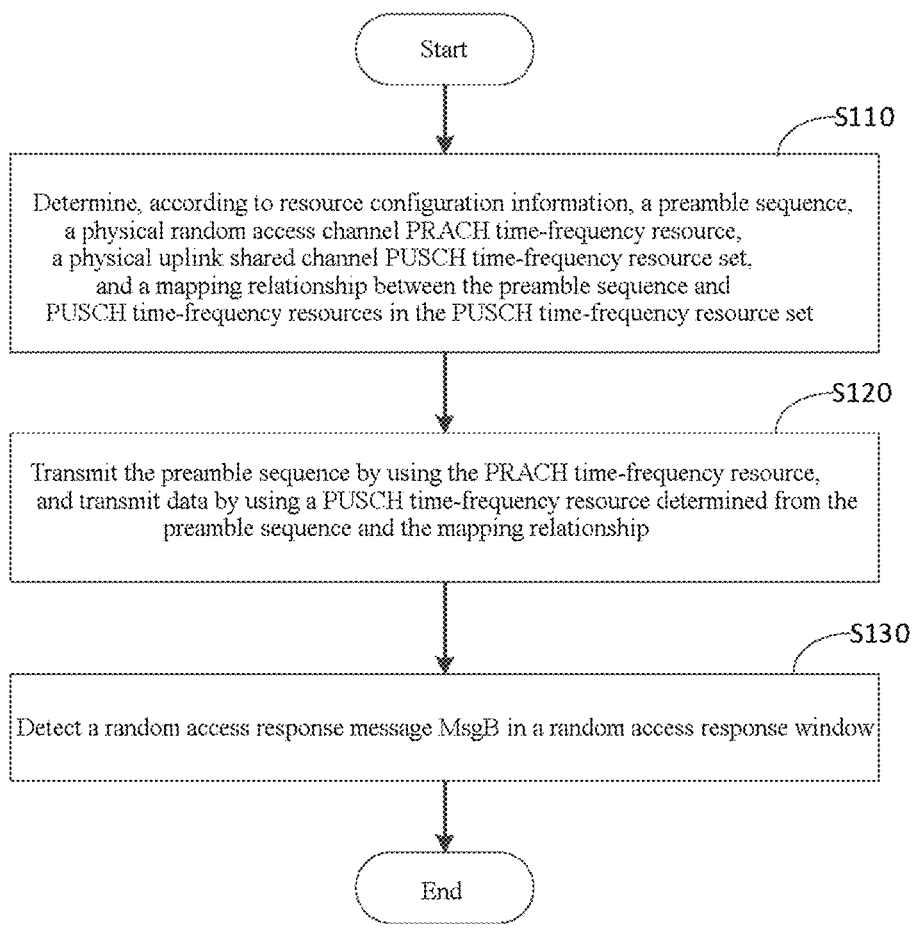
FIG. 1 shows a flowchart of a data transmission method according to an embodiment of the present disclosure.

Various exemplary embodiments, features and aspects of the present disclosure will be described in detail with reference to the drawings. The same reference numerals in the drawings represent parts having the same or similar functions. Although various aspects of the embodiments are shown in the drawings, it is unnecessary to proportionally draw the drawings unless otherwise specified.

Herein the specific term "exemplary" means "used as an example, or embodiment, or explanatory". An "exemplary" embodiment given here is not necessarily construed as being superior to or better than other embodiments.

In addition, numerous details are given in the following specific embodiments for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure becomes apparent.

As can be appreciated from the Background, in the related art, 4 steps of interaction between the terminal and the base station are required in order to complete the random access process (4-step RACH). However, this is too long for terminals sensitive to latency, and is unfavorable to the interaction between the terminal and the base station.

In view of the drawback of long latency in the 4-step RACH described above, the 3GPP Working Groups adopted a new project, namely, enhancing the original 4-step RACH so as to complete the random access process in two steps (2-step RACH). Specifically, Msg1 and Msg3 in the original 4-step RACH are combined into a message MsgA, and Msg2 and Msg4 are combined into a message MsgB. MsgA includes at least the contents of Msg1/Msg3 in the 4-step RACH, and MsgB includes at least the contents of Msg2/Msg4 in the 4-step RACH. However, the related art fails to discuss the time-frequency resources for transmitting data in MsgA.

The technical solution proposed in the present disclosure can determine the time-frequency resources for transmitting the data in MsgA.

Referring to FIG. 1, it shows a flowchart of a data transmission method according to an embodiment of the present disclosure.

The method is applicable to a terminal that may include User Equipment (UE), which, for example, includes but is not limited to mobile terminals such as mobile phones and mobile computers. As shown in FIG. 1, the method comprises:

step S110: determining, based on resource configuration information, a preamble sequence, a physical random access channel PRACH time-frequency resource, a physical uplink shared channel PUSCH time-frequency resource set, and a mapping relationship between the preamble sequence and PUSCH time-frequency resource in the PUSCH time-frequency resource set;

step S120: transmitting the preamble sequence by using the PRACH time-frequency resource, and transmitting the data by using a PUSCH time-frequency resource determined from the preamble sequence and the mapping relationship; and step S130: detecting a random access response message MsgB in a random access response window.

With the aforementioned methods, the present disclosure can, after obtaining resource configuration information from the base station, parse the resource configuration information, thereby determining, based on the parsed information, the preamble sequences used by the terminal for the random access, PRACH time-frequency resources for sending the preamble sequences, a PUSCH time-frequency resource set for sending data, and mapping relationships between preamble sequences in the preamble sequence set and PUSCH time-frequency resources in the PUSCH time-frequency resource set, determining the PUSCH time-frequency resources for sending data based on the preamble sequences determined by the terminal and the mapping relationships, then sending the preamble sequences by using the determined PRACH time-frequency resources while sending the data by using the PUSCH time-frequency resources, and detecting the random access response message MsgB from the base station in the random access response window. The present disclosure may send the preamble sequences and the data at the same time, and afterwards listen for and receive the random access response message MsgB from the base station, such that the terminal may interact with the base station in two steps, i.e., achieving random access and reduced latency. Besides, depending upon the mapping relationships between the preamble sequences and the PUSCH time-frequency resources, the base station can acquire the PUSCH time-frequency resources for sending data by the terminal according to the received preamble sequences and the mapping relationships, and acquire the information sent from the terminal by using the PUSCH time-frequency resources. In this manner, the number of interactions between the terminal and the base station is reduced.

In a possible embodiment, the resource configuration information may include a preamble sequence set, and the preamble sequence set includes a plurality of available preamble sequences configured by the base station for the terminal. The terminal can select a corresponding preamble sequence randomly or according to the data volume to be sent.

In a possible embodiment, the preamble sequence may be composed of CP (Cyclic Prefix) and Sequence. Different preamble formats will lead to different lengths of CP and/or Sequence.

In a possible embodiment, the resource configuration information may further includes a PRACH time-frequency set, from which the terminal can select the PRACH time-frequency resource used to transmit the selected preamble sequence.

In a possible embodiment, the PRACH time-frequency resources may include PRACH time domain resources and PRACH frequency domain resources. The PRACH time domain resources may be in milliseconds (ms) or in symbols. For example, the PRACH time domain resources can occupy several ms (e.g., if the preamble sequence is a long sequence, it may occupy 1 ms, 3.5 ms, etc.), or several symbols (e.g., if the preamble sequence is a short sequence, it may occupy 2 symbols, 4 symbols, etc.). The frequency domain resources can include a plurality of PRBs (Physical Resource Blocks). Each PRB can include 12 sub-carriers, and the spacing of the sub-carriers can be 15 kHz/30 kHz/60 kHz/120 kHz or the like.

In a possible embodiment, the terminal may determine the time domain duration (length) of the time domain resources in the PRACH time-frequency resources occupied by the preamble sequence according to the length of the preamble sequence indicated by the base station. For instance, when the preamble sequence is a long sequence, the length of the PRACH time domain resource may be in ms, and when the preamble sequence is a short sequence, the length of the PRACH time domain resource may be in symbol. Whether the preamble sequence is a long or short sequence is subject to the preamble format.

In a possible embodiment, the terminal can determine the frequency domain length of the frequency domain resources in the PRACH time-frequency resources based on SCS (Sub-carrier Spacing) adopted for PRACH, and determine the number of required physical resource blocks PRBs based on the sub-carrier spacing in the data channel.

In a possible embodiment, the data from the PUSCH time-frequency resources may include service data and/or signaling-related data, such as RRC (Radio Resource Control) connection requests, unique user identification information (terminal ID, token, random number, etc.), numbering of beam directions, and channel quality information.

Figure 2:
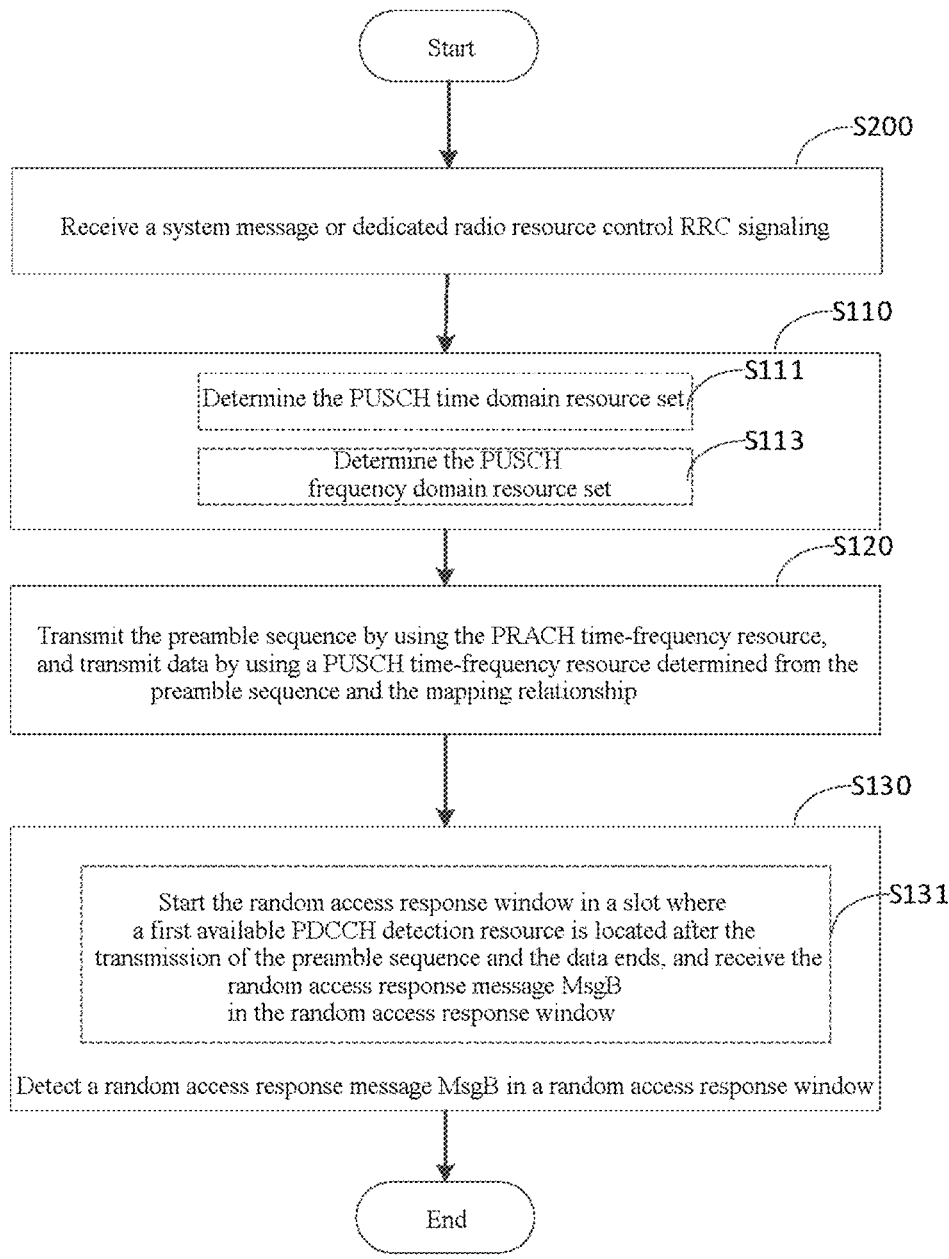
FIG. 2 shows a flowchart of a data transmission method according to an embodiment of the present disclosure.

Referring to FIG. 2, it shows a flowchart of a data transmission method according to an embodiment of the present disclosure.

As shown in FIG. 2, in a possible embodiment, the PUSCH time-frequency resource set includes a PUSCH time domain resource set and a PUSCH frequency domain resource set, and determining, according to the resource configuration information, the preamble sequence, the physical random access channel PRACH time-frequency resource, the physical uplink shared channel PUSCH time-frequency resource set, and the mapping relationship between the preamble sequence and the PUSCH time-frequency resources in the PUSCH time-frequency resource set (step S110) may comprise:

step S111: determining the PUSCH time domain resource set; and step S113: determining the PUSCH frequency domain resource set.

In a possible embodiment, determining the PUSCH time domain resource set (step S111) may comprise:

determining a starting slot and a starting time domain symbol of the PUSCH time domain resource set; and determining an ending slot and an ending time domain symbol of the PUSCH time domain resource set.

In different scenarios, the terminal can determine, by different methods, the starting slot, starting time domain symbol, ending slot, and ending time domain symbol of the PUSCH time-frequency resource set.

For example, in a possible embodiment, the preamble sequences and the data can be transmitted in the same slot. In this situation, the PRACH time domain resources for transmitting the preamble sequences and the PUSCH time domain resources for transmitting the data are in the same slot.

For example, the PUSCH time domain resources may be located after the PRACH time domain resources. Determining the starting slot and the starting time domain symbol of the PUSCH time domain resource set may comprise:

determining a slot where a last time domain symbol of time domain resources in the PRACH time-frequency resource is located as the starting slot, and determining a last time domain symbol of time domain resources in the PRACH time-frequency resource as the starting time domain symbol.

In a possible embodiment, the resource configuration information includes length of PUSCH time domain resources and a number of consecutively occupied time domains. The PUSCH time domain resources may be located before the PRACH time domain resources. Determining the starting slot and the starting time domain symbol of the PUSCH time domain resource set may further comprise:

determining a slot where a first time domain symbol of time domain resources in the PRACH time-frequency resource is located as the ending slot, and determining a first time domain symbol of time domain resources in the PRACH time-frequency resource as the ending time domain symbol;

determining the starting slot according to the length and the number of consecutively occupied time domains of the PUSCH time domain resources and the ending slot; and determining the starting time domain symbol according to the length and the number of consecutively occupied time domains of the PUSCH time domain resources and the ending time domain symbol.

After the ending slot and the ending time domain symbol of the PUSCH time domain resources are determined, the starting time domain symbol of the PUSCH time domain resources can be calculated by the length of the PUSCH time domain resources and the number of consecutively occupied time domains of the PUSCH time domain resources.

In a possible embodiment, the resource configuration information includes the slot offset and the starting symbol index, and determining the starting slot and the starting time domain symbol of the PUSCH time domain resource set may further comprise:

determining the starting slot of the PUSCH time domain resource according to the slot where a last time domain symbol of the time domain sources in the PRACH time-frequency resources is located and the slot offset, and determining the starting time domain symbol in the starting slot according to the starting symbol index.

In a possible embodiment, the preambles sequence and the data may be transmitted in different slots. In this situation, the PRACH time domain resources for transmitting the preamble sequences and the PUSCH time domain resources for transmitting the data are in different slots. Under this circumstance, in a possible embodiment, the resource configuration information includes starting symbol index, and determining the starting slot and the starting time domain symbol of the PUSCH time domain resource set further comprises:

determining, as the starting slot, an uplink slot adjacent to a slot where a last slot symbol of the time domain sources in the PRACH time-frequency resources is located, and determining the starting time domain symbol in the starting slot according to the starting symbol index.

In a possible embodiment, the length of the PUSCH time-frequency resources may be in slot or in time domain symbol. For instance, the length of one PUSCH time-frequency resource can be including 2 time domain symbols.

In a possible embodiment, the starting time domain symbol index can be designated as appropriate, e.g., as 3, 4, etc.

In other embodiments, the starting time domain symbol can also be determined by means of the designated number of gap symbols and the designated time domain symbol. For example, determining the starting time domain symbol in the uplink slot according to the designated gap symbols and the designated time domain symbol may comprise:

determining, as the starting time domain symbol, the time domain symbol offset from the designated time domain symbol (such as the first time domain symbol) in the uplink slot by the designated number of gap symbols.

Certainly, in other embodiments, the base station may directly indicate an arbitrary symbol in the uplink slot as the starting time domain symbol.

In a possible embodiment, the preamble sequences and the data can be transmitted with interval slots. The base station can indicate the number of interval slots based on the resource configuration information. In this context, the PRACH time domain resources for transmitting the preamble sequence and the PUSCH time domain resources for transmitting the data is the number of interval slots apart.

Under this circumstance, the resource configuration information includes the starting symbol index and the number of interval slots, and determining the starting slot and the starting time domain symbol of the PUSCH time domain resource set further comprises:

determining, as the starting slot, a slot offset by the number of interval slots from a slot where a last slot symbol of the time domain sources in the PRACH time-frequency resources is located, and determining the starting time domain symbol in the starting slot according to the starting symbol index.

In a possible embodiment, different preamble sequences can be transmitted by different PRACH time domain resources. Those different preamble sequences can be mapped to different PUSCH time domain resources. When the PRACH time domain resources are adjacent to one another, it is possible to determine the starting slot and the starting time domain symbol of the PUSCH time domain resources to be determined according to the PUSCH resources corresponding to the adjacent PRACH time domain resources.

For example, the resource configuration information includes the starting symbol index, and determining the starting slot and the starting time domain symbol of the PUSCH time domain resource set further comprises:

determining, as the starting slot, a slot where the ending time domain symbol of the PUSCH time domain resource set is located, the PUSCH time domain resource set corresponding to a preceding PRACH time domain source in the same slot, using the ending time domain symbol of the PUSCH time domain resource set as the starting time domain symbol, or determining the starting time domain symbol according to the starting symbol index and the ending time domain symbol of the PUSCH time domain resource set.

For example, if PRACH time domain resource A is adjacent to PRACH time domain resource B, they can be in the same slot. The PRACH time domain resource A can be used to transmit preamble sequence A, and the PRACH time domain resource B can be used to transmit preamble sequence B. The PRACH time domain resource A corresponds to PUSCH time domain resource A in the PUSCH time domain resource set. If the PUSCH time domain resource B corresponding to the PRACH time domain resource B is to be determined, according to the above-mentioned method, the slot where the ending time domain symbol of PUSCH time domain resource A is located may be taken as the starting slot of the PUSCH time domain resource B, and the ending time domain symbol of the PUSCH time domain resource A may be taken as the starting time domain symbol of the PUSCH time domain resource B. Alternatively, the starting time domain symbol of the PUSCH time domain resource B can be determined, according to the number of starting time domain symbols in the resource configuration information and the ending time domain symbol of the PUSCH time domain resource B.

In a possible embodiment, the resource configuration information further includes PUSCH time domain resource length and a number of consecutively occupied time domains throughout the PUSCH time domain resource length, and determining the ending slot and the ending time domain symbol of the PUSCH time domain resource set comprises:

determining the ending slot and the ending time domain symbol of the time domain resource set according to the starting slot, the starting time domain symbol, the PUSCH time domain resource length, and the number of consecutively occupied time domains throughout the PUSCH time domain resource length.

In a possible embodiment, the PUSCH time domain resource length may be several time lengths in ms, several slots, or several time domain symbols. The present disclosure does not limit the specific size of the PUSCH time domain resource length, which can be set by a person skilled in the art depending upon different actual scenarios and demands Once the starting slot and the starting time domain symbol of the PUSCH time domain resource set are determined, the ending slot and the ending time domain symbol of the PUSCH time domain resource set can be determined, according to the PUSCH time domain resource length indicated by the base station and the number of consecutively occupied time domains throughout the PUSCH time domain resource length (which may be consecutive PUSCH time domain resources).

In a possible embodiment, the resource configuration information further includes at least one of a number of the preamble sequences, a length and a number of consecutively occupied frequency domains of the PUSCH frequency domain resource, or PUSCH time domain resource duration, and determining the ending slot and the ending time domain symbol of the PUSCH time domain resource set comprises:
    determining the ending slot and the ending time domain symbol according to at least one of the number of the preamble sequences, the length and the number of consecutively occupied frequency domains of the PUSCH frequency domain resource, the PUSCH time domain resource duration, or a mapping relationship between preamble sequences in a preamble sequence set and PUSCH time-frequency resources in the PUSCH time-frequency resource set.

In a possible embodiment, if the base station does not allocate the number of consecutively occupied frequency domains of the PUSCH time domain resource length, the terminal will default the number to 1.

In a possible embodiment, if the base station does not allocate the number of consecutively occupied frequency domains of the PUSCH frequency domain resource length, the terminal will default the number to 1.

In a possible embodiment, the length of the PUSCH frequency domain resources may be a plurality of physical resource blocks PRBs or a plurality of sub-carriers. The length of the PUSCH frequency domain resources can be set according to actual scenarios, but the present disclosure does not limit the length herein.

In a possible embodiment, the number of consecutively occupied frequency domains of the PUSCH frequency domain resources can be determined according to the number of the PUSCH time domain resources, the number of preamble sequences, and the mapping relationship.

When the base station indicates the number of the PUSCH time domain resources, the number of preamble sequences, and the mapping relationship, the terminal can acquire the number of the PUSCH frequency domain resources from the aforesaid information.

After the starting slot, the starting time domain symbol, the ending slot, and the ending time domain symbol of the PUSCH time domain resource set are determined, the terminal can determine the PUSCH time domain resource set accordingly.

In a possible embodiment, determining the PUSCH frequency domain resource set may comprise:
    determining a starting position of the PUSCH frequency domain resource set; and
    determining an ending position of the PUSCH frequency domain resource set.

In a possible embodiment, the resource configuration information includes frequency domain offset and/or frequency domain reference points, and determining the starting position of the PUSCH frequency domain resource set comprises:
    determining the starting position of the PUSCH frequency domain resource set according to a frequency domain starting position, a frequency domain ending position, or the frequency domain reference points of the PRACH frequency domain resource, along with the frequency domain offset.

In the present embodiment, the starting position of the PUSCH frequency domain resource set can be determined based on the frequency domain starting position of the PRACH frequency domain resources and the frequency domain offset; or the starting position of the PUSCH frequency domain resource set can be determined based on the frequency domain ending position of the PRACH frequency domain resources and the frequency domain offset; or the starting position of the PUSCH frequency domain resource set can be determined based on the designated frequency domain reference points and the frequency domain offset.

The frequency domain offset can be set as actually required, and the present disclosure does not limit the same.

The frequency domain reference points can be determined according to actual scenarios, and the present disclosure does not limit the same.

In a possible embodiment, determining the starting position of the PUSCH frequency domain resource set comprises:
    determining the ending position of the PUSCH frequency domain resource set corresponding to a preceding adjacent frequency domain as a starting position of a PUSCH frequency domain resource set corresponding to the adjacent frequency domains.

With the above-mentioned method, the present disclosure can determine the starting position of the PUSCH frequency domain resource set adjacent to the determined PUSCH frequency domain resource set.

In a possible embodiment, the resource configuration information may include a number of preamble sequences, a length of the PUSCH frequency domain resource, and a number of consecutively occupied time domains throughout the PUSCH time domain resource length, and determining the ending position of the PUSCH frequency domain resource set comprises:
    determining the ending position of the PUSCH frequency domain resource set according to at least one of the starting position of the PUSCH frequency domain resource set, the number of the preamble sequences, the PUSCH frequency domain resource length, the number of consecutively occupied time domains throughout the PUSCH time domain resource length, or the mapping relationship.

In a possible embodiment, the number of the PUSCH frequency domain resources can be determined based on the length and the number of consecutively occupied time domains of the PUSCH time domain resources, the number of preamble sequences, and the mapping relationship, and then the ending position of the PUSCH frequency domain resource set can be determined based on the length of the PUSCH frequency domain resources and the number of consecutively occupied frequency domains. A plurality of PUSCH frequency domain resource sets can form a total PUSCH frequency domain resource set. The ending position of the total PUSCH frequency domain resource set can be determined by the method described below.

In a possible embodiment, the resource configuration information may include a length of the PUSCH frequency domain resources, a number of consecutively occupied frequency domains, and a number of the PRACH frequency domain resources, and determining the ending position of the PUSCH frequency domain resource set comprises:

determining an ending position of a total PUSCH frequency domain resource set comprising a plurality of the PUSCH frequency domain resource sets, according to the length of the PUSCH frequency domain resources and the number of consecutively occupied frequency domains throughout the length of the PUSCH frequency domain resources.

In a possible embodiment, the resource configuration information may include a length of the PUSCH frequency domain resources, a number of the PUSCH frequency domain resource length, and a number of the PRACH frequency domain resources, and determining the ending position of the PUSCH frequency domain resource set comprises:

determining the ending position according to the PUSCH frequency domain resource length, the number of the PUSCH frequency domain resources, and the number of the PRACH frequency domain resources.

In a possible embodiment, the resource configuration information includes at least one of a number of preamble sequences, length of the PUSCH frequency domain resources, and length of the PUSCH time domain resources, and a number of consecutively occupied time domains, and determining the ending position of the PUSCH frequency domain resource set comprises:

determining an ending position of a total PUSCH frequency domain resource set comprising a plurality of the PUSCH frequency domain resource sets, according to at least one of the starting position of the PUSCH frequency domain resource set, the number of the preamble sequences, the PUSCH frequency domain resource length, the PUSCH time domain resource length, the number of consecutively occupied time domains throughout the PUSCH time domain resource length, or the mapping relationship, along with the number of the PRACH frequency domain resources.

In a possible embodiment, the resource configuration information further includes an association between a beam and the PRACH time-frequency resource, and determining the PUSCH frequency domain resource set further comprises:

determining the PRACH time-frequency resource according to a selected beam and the association; and
    determining the PUSCH frequency domain resource set according to the time-frequency resource and the mapping relationship.

In a possible embodiment, in a multi-beam scenario, the base station can determine the optimal beam for the terminal to receive information, and associates the PRACH resources for transmitting preamble sequences by the terminal with the optimal beam. After the base station learns the optimal beam of UE, the terminal will interact with the base station on the optimal beam.

In a possible embodiment, the resource configuration information includes a preamble sequence set that may include available preamble sequences configured by the base station for the terminal, and the mapping relationship comprises:

a one-to-one mapping relationship between a preamble sequence in the preamble sequence set and a PUSCH time-frequency resource in the PUSCH time-frequency resource set; or
    a one-to-many mapping relationship between a preamble sequence in the preamble sequence set and a plurality of PUSCH time-frequency resources in the PUSCH time-frequency resource set; or
    a many-to-one mapping relationship between a plurality of preamble sequences in the preamble sequence set and a PUSCH time-frequency resource in the PUSCH time-frequency resource set.

In a possible embodiment, the resource configuration information includes a mapping number parameter between preamble sequences and the PUSCH time-frequency resources (mappingnumberofbetweenPreambleandPUSCH). It should be understood that the present disclosure does not limit how to name the parameters.

There is a one-to-one mapping relationship between a preamble sequence in the preamble sequence set and a PUSCH time-frequency resource in the PUSCH time-frequency resource set, in a case where the mapping number is a first preset value; or there is a one-to-many mapping relationship between a preamble sequence in the preamble sequence set and a plurality of PUSCH time-frequency resources in the PUSCH time-frequency resource set, or a many-to-one mapping relationship between a plurality of preamble sequences in the preamble sequence set and a PUSCH time-frequency resource in the PUSCH time-frequency resource set, in a case where the mapping number is not the first preset value.

In a possible embodiment, the first preset value is 1, or a value other than 1.

When the first preset value is 1, it may denote that the base station indicates one-to-one mapping between the preamble sequences of the terminal and the PUSCH time-frequency resources. In this instance, each preamble sequence is mapped to one PUSCH time-frequency resource respectively, and each preamble sequence has a mapping relationship with one PUSCH time-frequency resource in one-to-one correspondence.

When the first preset value is not 1, it may denote that the base station indicates one-to-many mapping or many-to-one mapping between the preamble sequences of the terminal and the PUSCH time-frequency resources. For example, in case of the one-to-many mapping, each preamble sequence may have a one-to-many mapping relationship with a plurality of PUSCH time-frequency resources, and in case of the many-to-one mapping, a plurality of preamble sequences may have a many-to-one mapping relationship with one PUSCH time-frequency resource.

Certainly, in other embodiments, the base value of the first preset value may not be 1 or may not be set. In addition to a one-to-one mapping relationship, a many-to-one mapping relationship and a one-to-many mapping relationship, there may also be other mapping relationships, e.g., combinations thereof, but the present disclosure is not limited thereto.

In a possible embodiment, the mapping may be carried out in different ways according to different first preset values satisfied by the mapping number parameter. For example, when the first preset value is 1, one preamble sequence is mapped to one PUSCH time-frequency resource; when the first preset value is greater than 1, a plurality of preamble sequences are mapped to one PUSCH time-frequency resource; and when the first preset value is less than 1, one preamble sequence is mapped to a plurality of PUSCH time-frequency resources, and vice versa. The present disclosure is not limited thereto.

Furthermore, the mapping number can be used to indicate different numbers of the preamble sequences and the PUSCH time-frequency resources in the mappings.

For example, when the first preset value is 1, one preamble sequence is one-to-one mapped to one PUSCH time-frequency resource; when the first preset value is m (m>1), m preamble sequences are many-to-one mapped to one PUSCH time-frequency resource; when the first preset value is k (0<k<1), one preamble sequence is one-to-many mapped to 1/k PUSCH time-frequency resources, and when 1/k is not an integer, 1/k can be rounded up or down to an integer.

In a possible embodiment, the PUSCH time-frequency resource set includes time domain resources and frequency domain resources, and the mapping relationship further comprises:

a mapping relationship between the preamble sequences in the preamble sequence set and the PUSCH time-frequency resources in the PUSCH time-frequency resource set, where a direction of time domain resources precedes over a direction of frequency domain resources; or a mapping relationship between the preamble sequences in the preamble sequence set and the PUSCH time-frequency resources in the PUSCH time-frequency resource set, where a direction of frequency domain resources precedes over a direction of time domain resources.

The time domain resources and frequency domain resources in the PUSCH time-frequency resource set have different directions. The preamble sequences and the PUSCH time-frequency resources can be mapped in the sequential order of the time domain resource direction, or the frequency domain resource direction.

The one-to-one mapping relationship, many-to-one mapping relationship, and one-to-many mapping relationship can be discussed separately.

In a possible embodiment, the base station can firstly allocate the transmission resources of the terminal based on the resource configuration information.

The base station can configure the terminal such that the terminal transmits a preamble sequence by using the PRACH time-frequency resource corresponding to the short sequence shown in preamble format A3. In this situation, the time domain resources in the PRACH time-frequency resource may occupy 6 time domain symbols.

Based on the resource configuration information, the base station can configure the starting position of frequency domains in the frequency domain resource of the PUSCH time-frequency resource as a position offset by mPRBs relative to the ending position of the frequency domain resources in the PRACH time-frequency resource set. The frequency domain offset mPRBs can be set in light of actual situations.

Based on the resource configuration information, the base station can configure the starting position of time domains in the time domain resource of the PUSCH time-frequency resource as a position offset by the number of starting time domain symbols (symboloffset) relative to the designated slot. The designated slot may be the slot where preamble format A3 is located. The slot offset may be an offset by 2 slots. The number of starting time domain symbols may be, for example, symbol7 in the slot, offset by 2 slots relative to the slot where preamble format A3 is located.

Based on the resource configuration information, the base station can configure the PUSCH time domain resource duration as 2 time domain symbols, or the duration can be set to different values in other situations. For example, it can be set according to the length of the data to be transmitted. The length of the data may be 56 bit or 72 bit, or other bits depending on the situation.

Figure 3A:
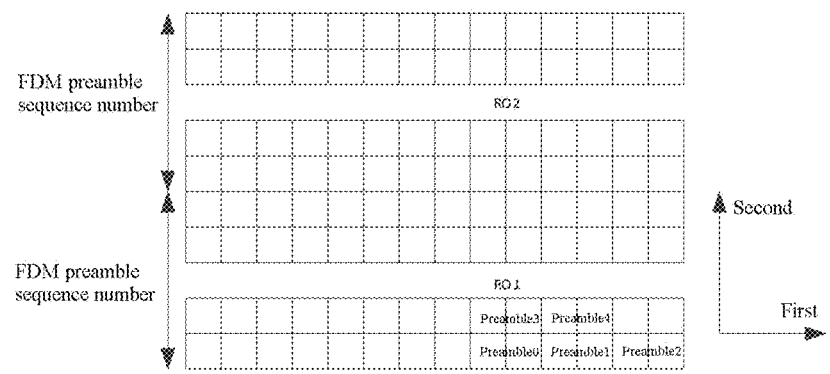
FIG. 3a to FIG. 3e show schematic diagrams for the mapping relationships between preamble sequences and PUSCH time-frequency resources according to an embodiment of the present disclosure.

Referring to FIG. 3a, it shows a schematic diagram for the mapping relationship between the preamble sequence and the PUSCH time-frequency resource according to an embodiment of the present disclosure.

As shown in FIG. 3a, when the base station has set the starting position of the PUSCH time domain resources (e.g., the number of starting time domain symbol is 7) and the length of the PUSCH time domain resources (e.g., 2 time domain symbols), if the mapping number indicates a one-to-one mapping relationship, one preamble sequence is individually mapped to one PUSCH time-frequency resource. In this instance, according to "the mapping relationship between the preamble sequences in the preamble sequence set and the PUSCH time-frequency resources in the PUSCH time-frequency resource set where the direction of time domain resources precedes over the direction of frequency domain resources", the preamble sequences are sequentially mapped along the direction of the time domain resources, and then mapped along the direction of the frequency domain resources, e.g., after reaching the ending time domain symbol in the time domain resource direction. As shown in FIG. 3a, preamble0, preamble1, and preamble2 are one-to-one mapped to the PUSCH time-frequency resources along the time domain direction, in which the PUSCH time domain resource corresponding to each preamble sequence occupies 2 symbols, and then mapped along the frequency domain direction after reaching the ending time domain symbol of the slot where the PUSCH time domain resource is located (or after a failure to be mapped to the remaining time domain resources). As shown in FIG. 3a, the PUSCH time-frequency resources mapped to preamble3 and preamble4 are in different frequency domains from the PUSCH time-frequency resources mapped to preamble0, preamble1, and preamble2.

Figure 3B:
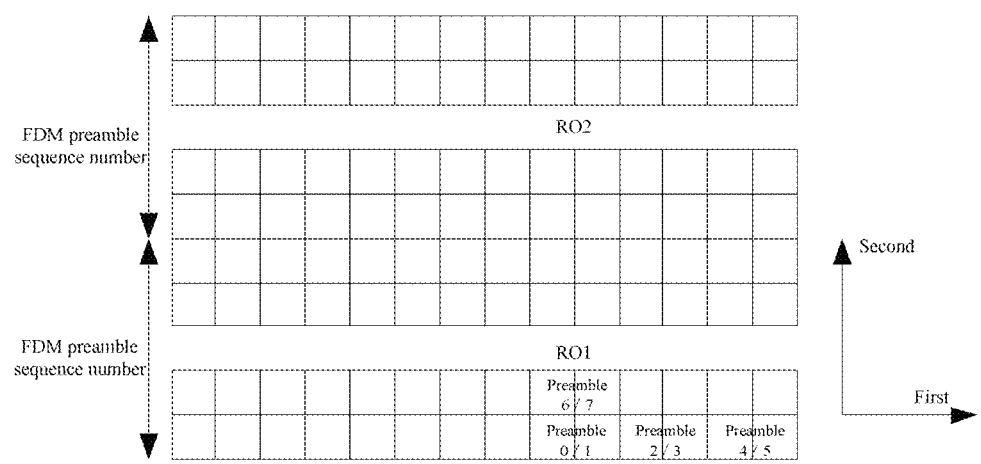

Referring to FIG. 3b, it shows a schematic diagram for the mapping relationship between the preamble sequence and the PUSCH time-frequency resource according to an embodiment of the present disclosure.

As shown in FIG. 3b, if the mapping number indicates a many-to-one mapping relationship, a plurality of preamble sequences (for example, if the mapping number is 2, two preamble sequences are mapped to the same PUSCH time-frequency resource) may be mapped to one PUSCH time-frequency resource. According to "the mapping relationship between the preamble sequences in the preamble sequence set and the PUSCH time-frequency resources in the PUSCH time-frequency resource set where the direction of time domain resources precedes over the direction of frequency domain resources", preamble sequences in pairs (for example) are sequentially mapped along the direction of the time domain resources, and then mapped along the direction of the frequency domain resources, e.g., after reaching the ending time domain symbol in the direction of the time domain resources. As shown in FIG. 3b, preamble0 and preamble1 are mapped to the same PUSCH time-frequency resource, and in turn, preamble2 and preamble3 to another PUSCH time-frequency resource, and preamble4 and preamble5 to yet another PUSCH time-frequency resource, and then mapped along the frequency domain direction after reaching the ending time domain symbol of the slot where the PUSCH time domain resource is located (or after a failure to be mapped to the remaining time domain resources). As shown in FIG. 3b, the PUSCH time-frequency resources mapped to preamble6 and preamble1 are in different frequency domains from the PUSCH time-frequency resources mapped to preamble0 to preamble5.

Figure 3C:
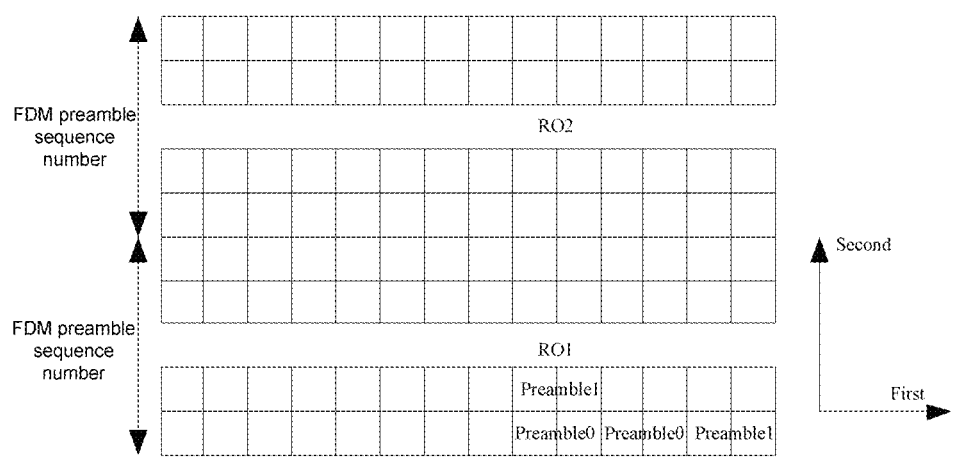

Referring to FIG. 3c, it shows a schematic diagram for the mapping relationship between the preamble sequence and the PUSCH time-frequency resource according to an embodiment of the present disclosure.

As shown in FIG. 3c, if the mapping number indicates a one-to-many mapping relationship, one preamble sequence may be mapped to a plurality of PUSCH time-frequency resources (for example, the mapping number is 1/2, indicating one preamble sequence is mapped to two PUSCH time-frequency resources). According to "the mapping relationship between the preamble sequences in the preamble sequence set and the PUSCH time-frequency resources in the PUSCH time-frequency resource set, where a direction of time domain resources precedes over a direction of frequency domain resources", the preamble sequences are sequentially mapped along the direction of the time domain resources, and then mapped along the direction of the frequency domain resources, e.g., after reaching the ending time domain symbol in the direction of the time domain resources. As shown in FIG. 3c, preamble0 is mapped to two adjacent PUSCH time-frequency resources (for example), and in turn, preamble1 to the other two adjacent PUSCH time-frequency resources. To satisfy the one-to-many mapping relationship, preamble1 reaches the ending time domain symbol of the slot where the PUSCH time domain resource is located after being mapped to one PUSCH time-frequency resource, and thus is further mapped along the direction of the frequency domain resources.

Here, the one-to-one mapping is taken as an example to illustrate "the mapping relationship between the preamble sequences in the preamble sequence set and the PUSCH time-frequency resources in the PUSCH time-frequency resource set, where a direction of frequency domain resources precedes over a direction of time domain resources".

Figure 3D:
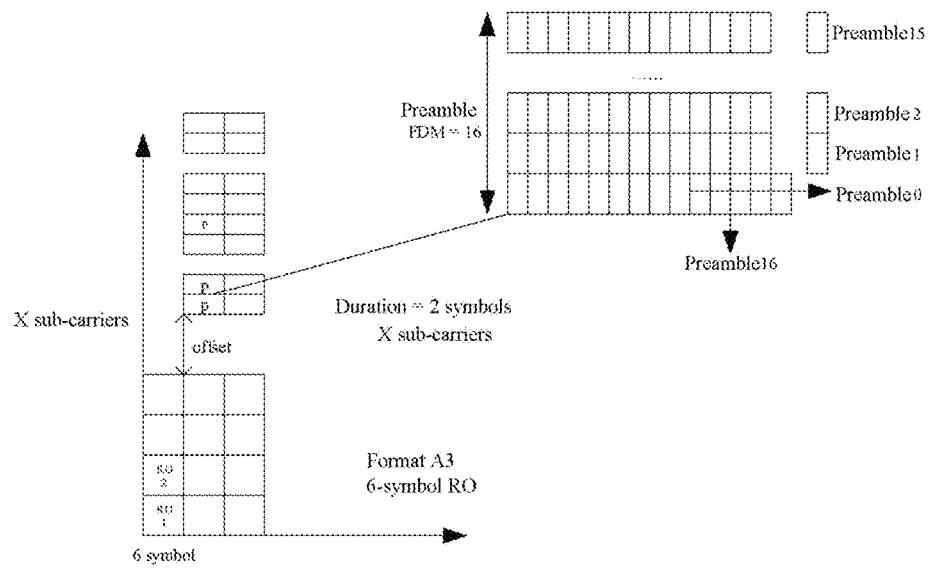

Referring to FIG. 3d, it shows a schematic diagram for the mapping relationship between the preamble sequence and the PUSCH time-frequency resource according to an embodiment of the present disclosure.

As shown in FIG. 3d, the preamble sequences are sequentially mapped along the direction of the frequency domain resources, and then mapped along the direction of the time domain resources, e.g., after reaching the ending position in the direction of the frequency domain resources. As shown in the figure, preamble0 is mapped to two PUSCH time-frequency resources (for example), and in turn, preamble1 to preamble15 are mapped to the PUSCH time-frequency resources in different frequency domains, and then preamble16 is mapped along the direction of the time domain resources after reaching the ending position in the direction of the frequency domain resources. As shown in FIG. 3d, the PUSCH time-frequency resources to which preamble1 to preamble15 are mapped are in different time domains from those to which preamble16 is mapped.

For one-to-many mapping and many-to-one mapping, the principle of mapping will not be described repeatedly here for brevity, as it is similar to the principle in one-to-one mapping.

In a possible embodiment, the starting slot of the PUSCH time-frequency resource may be a slot where the corresponding PRACH time/frequency domain resource is located. The starting time domain symbol of the PUSCH time-frequency resource may be the ending time domain symbol of the corresponding PRACH time domain resource. The starting slot of the PUSCH time-frequency resource may also be the nearest uplink slot, or a slot offset by several slots from the slot where the corresponding PRACH time/frequency domain resource is located. The base station may indicate the starting time domain symbol of the PUSCH time-frequency resource. It should be noted that once the starting slot and the starting time domain symbol of the PUSCH time/frequency domain resource are determined, the mapping principles are similar and will not be repeated here for brevity.

It should be understood that the above-mentioned description is intended to better illustrate but not to limit the present disclosure. In other embodiments, both the number and method of mapping can be adjusted as actually needed, which are not limited in the present disclosure.

In a possible embodiment, other configurations may be made to the transmission resources of the terminal based on the resource configuration information.

Figure 3E:
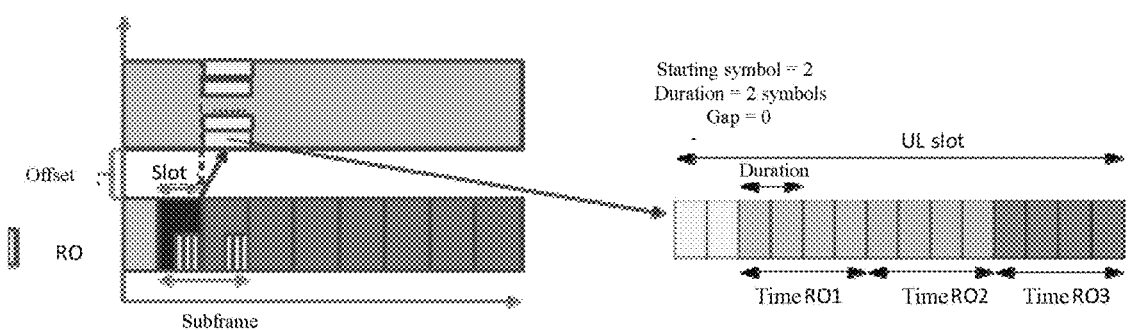

Referring to FIG. 3e, it shows a schematic diagram for the mapping relationship between the preamble sequence and the PUSCH time-frequency resource according to an embodiment of the present disclosure.

As shown in FIG. 3e, when the preamble sequences and the data can be transmitted in different slots,
  the base station can configure the terminal based on the resource configuration information such that the terminal transmits a preamble sequence by using the PRACH time-frequency resource corresponding to the short sequence shown in preamble format A1; in this situation, the time domain resource in the PRACH time-frequency resource may occupy 2 time domain symbols.

Based on the resource configuration information, the base station can configure the starting position of frequency domains in the frequency domain resources of the PUSCH time-frequency resource as a position offset by mPRBs relative to the ending position of the frequency domain resources in the PRACH time-frequency resource set; the frequency domain offset mPRBs can be set in light of actual situations.

Based on the resource configuration information, the base station can configure the PUSCH time domain resource length as 2 time domain symbols, or the length can be set to different values in other situations; for example, it can be set according to the length of the data to be transmitted; the length of the data may be 56 bit or 72 bit, or other bit length depending on the situation.

Based on the resource configuration information, the base station can configure the mapping number of the PUSCH time-frequency resources as 2.

Based on the resource configuration information, the base station can configure the starting position of the time domains in the PUSCH time-frequency resources, can set the starting position to a position offset by 1 slot from the slot where the PRACH time-frequency resource is located, can designate the starting position symbolindex of the PUSCH resource corresponding to each PRACH time-frequency resource in the designated slot, and can further indicate that the symbol gap between the PUSCH resources corresponding to different PRACH time-frequency resources is 0, for example, as shown in FIG. 3e:
  the starting position of time domains in the PUSCH time-frequency resource corresponding to the PRACH time-frequency resource RO1 may be a time domain symbol with the starting symbol index of 2;

the starting position of time domains in the PUSCH time-frequency resource corresponding to the PRACH time-frequency resource RO2 may be a time domain symbol with the starting symbol index of 6; or the starting position of time domains in the PUSCH time-frequency resource corresponding to the PRACH time-frequency resource RO3 may be a time domain symbol with the starting symbol index of 10.

In a possible embodiment, transmitting the data by using the PUSCH time-frequency resource determined from the preamble sequence and the mapping relationship (step S120) comprises:

randomly choosing one of the plurality of PUSCH time-frequency resources to transmit the data when the mapping relationship indicates a one-to-many mapping relationship between the preamble sequence and a plurality of PUSCH time-frequency resources.

As shown in FIG. 2, in a possible embodiment, the method may further comprise:

step S200: receiving a system message or dedicated radio resource control RRC signaling, the system message or the RRC signaling including the resource configuration information.

For example, when the terminal is not connected to the base station, the terminal can read from the downlink broadcast channel PBCH a system message including a MIB (Master Information Block) message or a SIB (System Information Block) message, and acquire from the system message the resource configuration information for configuring the transmission resources of the terminal by the base station.

When the terminal is connected to the base station, the terminal can acquire the resource configuration information via the radio resource control RRC signaling.

In a possible embodiment, the resource configuration information is acquired by the row index of a predefined table.

For example, the resource configuration information can be pre-configured in the form of a predefined table. The base station can designate a row as resource configuration information, and the terminal can obtain the required information by reading the parameter configuration information corresponding to the row index of the table.

The base station can send the resource configuration information to the terminal via a system message, dedicated RRC signaling, or other methods. In a possible embodiment, detecting the random access response message MsgB in the random access response window (step S130) may comprise:

step S131: starting the random access response window in a slot where a first available PDCCH detection resource after transmission of the preamble sequence and the data is located, and receiving the random access response message MsgB in the random access response window.

In a possible embodiment, the terminal can detect the random access response message MsgB from the base station in the random access response window. The terminal can start the response window for receiving MsgB at the starting symbol of the first available control resource set CORESET after the ending time domain symbol of the transmission of the preamble sequences and the data, or in the slot where the first available CORESET is located. The response window length of the random access response window can be set as needed.

In a possible embodiment, the base station may transmit the random access response message MsgB via PDCCH to transmit the position of the required resource. In this situation, the terminal can start the random access response window in the slot where the first available PDCCH detection resource after transmission of the preamble sequences and data is located, and receive the random access response message MsgB in the random access response window.

In a possible embodiment, the random access response message MsgB may include unique user identification information, Timing Advance (TA) information, uplink transmission authorization information, etc.

In a possible embodiment, if in the random access response window, the terminal fails to receive the random access response message MsgB from the base station, the terminal may select and send a new preamble sequence, and re-send the data (which may be updated data).

Figure 4:
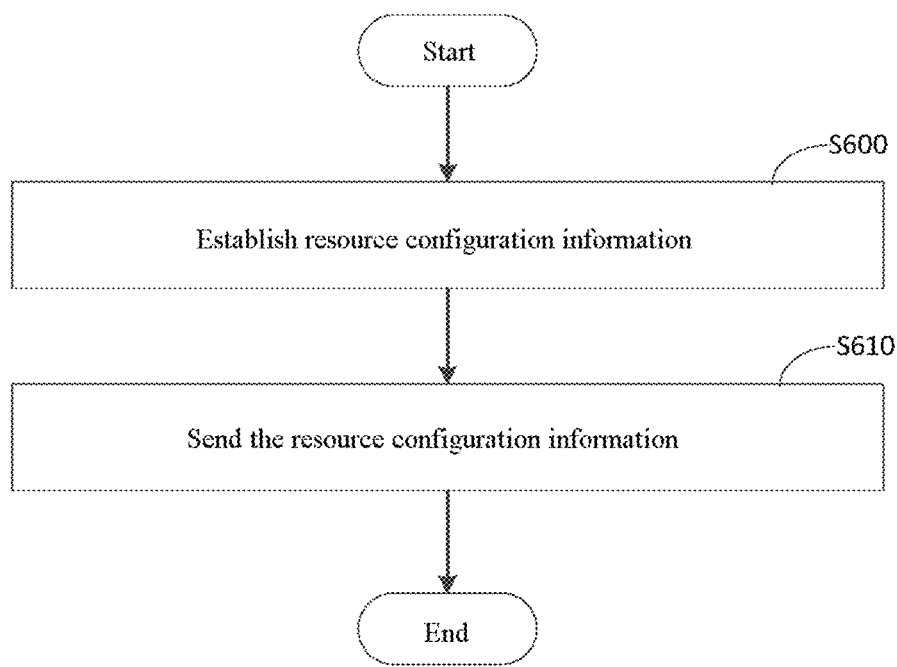
FIG. 4 shows a flowchart of a data transmission method according to an embodiment of the present disclosure.

Referring to FIG. 4, it shows a flowchart of a data transmission method according to an embodiment of the present disclosure.

The method may be applicable to a base station, as shown in FIG. 4, the method comprising:

step S600: establishing resource configuration information including at least one of preamble sequences, physical random access channel PRACH time-frequency resources, a physical uplink shared channel PUSCH time-frequency resource set, or a mapping relationship between the preamble sequences and PUSCH time-frequency resources in the PUSCH time-frequency resource set, the resource configuration information configured to allocate transmission resources; and step S610: sending the resource configuration information.

With the above-mentioned method, the present disclosure can establish resource configuration information, and send the resource configuration information to the terminal. The resource configuration information includes transmission resources used by the terminal to transmit data. Based on the resource configuration information, the terminal can select transmission resources for random access, and send preamble sequences and data.

In a possible embodiment, the PUSCH time-frequency resource set includes a PUSCH time domain resource set and a PUSCH frequency domain resource set, and the resource configuration information includes at least one of a starting slot, a starting time domain symbol, slot offset, a starting symbol index, the number of interval slots of the PUSCH time domain resource set, a length and the number of consecutively occupied time domains of a PUSCH time domain resource corresponding to each preamble sequence, the number of preamble sequences in the preamble sequence set, a length and the number of consecutively occupied frequency domains of the PUSCH frequency domain resource, the number of PRACH frequency domain resources, or the mapping relationship. The resource configuration information is configured to allocate the PUSCH time domain resource set and/or the PUSCH frequency domain resource set.

In a possible embodiment, the mapping relationship comprises:

a one-to-one mapping relationship between a preamble sequence in the preamble sequence set and a PUSCH time-frequency resource in the PUSCH time-frequency resource set; or a one-to-many mapping relationship between a preamble sequence in the preamble sequence set and a plurality of PUSCH time-frequency resources in the PUSCH time-frequency resource set; or a many-to-one mapping relationship between a plurality of preamble sequences in the preamble sequence set and a PUSCH time-frequency resource in the PUSCH time-frequency resource set.

In a possible embodiment, the resource configuration information includes a mapping number parameter, and further includes:

a one-to-one mapping relationship between a preamble sequence in the preamble sequence set and a PUSCH time-frequency resource in the PUSCH time-frequency resource set, in a case where the mapping number is a first preset value; or a one-to-many mapping relationship between a preamble sequence in the preamble sequence set and a plurality of PUSCH time-frequency resources in the PUSCH time-frequency resource set; or a many-to-one mapping relationship between a plurality of preamble sequences in the preamble sequence set and a PUSCH time-frequency resource in the PUSCH time-frequency resource set, in a case where the mapping number is not the first preset value.

In a possible embodiment, the first preset value is 1.

In a possible embodiment, the PUSCH time-frequency resource set includes a time domain resource set and a frequency domain resource set, and the mapping relationship further comprises:

a mapping relationship between the preamble sequences in the preamble sequence set and the PUSCH time-frequency resources in the PUSCH time-frequency resource set, where a direction of time domain resources precedes over a direction of frequency domain resources; or a mapping relationship between the preamble sequences in the preamble sequence set and the PUSCH time-frequency resources in the PUSCH time-frequency resource set, where a direction of frequency domain resources precedes over a direction of time domain resources.

Figure 5:
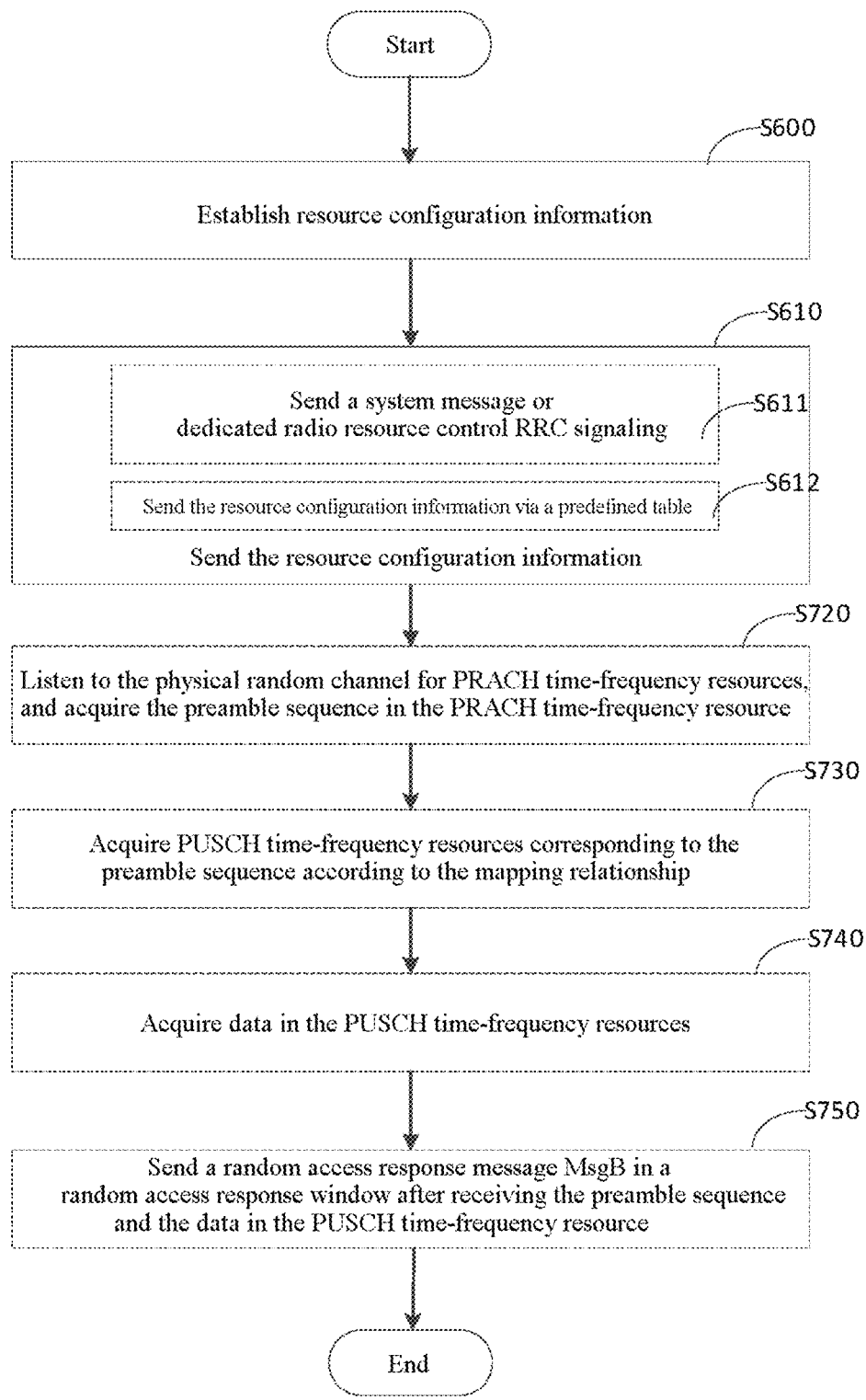
FIG. 5 shows a flowchart of a data transmission method according to an embodiment of the present disclosure.

Referring to FIG. 5, it shows a flowchart of a data transmission method according to an embodiment of the present disclosure.

The method may be applicable to a base station. As shown in FIG. 5, sending the resource configuration information (step S610) comprises:

step S611: sending a system message or dedicated radio resource control RRC signaling, the system message or the RRC signaling including the resource configuration information.

In a possible embodiment, the method further comprises:

step S612: sending the resource configuration information via a predefined table.

For example, the base station can pre-configure the resource configuration information in the form of a predefined table, and thereafter send it to the terminal via a system message or radio resource control RRC signaling, so as to allocate the transmission resources of the terminal.

In a possible embodiment, the method further comprises:

step S720: detecting PRACH time-frequency resources in a physical random channel, and acquiring preamble sequences in the PRACH time-frequency resources;

step S730: acquiring PUSCH time-frequency resources corresponding to the preamble sequences according to the mapping relationship; and step S740: acquiring data in the PUSCH time-frequency resources.

In a possible embodiment, the method further comprises:

step S750: sending a random access response message MsgB to the terminal in a random access response window, after receiving the preamble sequences and the data in the PUSCH time-frequency resources.

Figure 6:
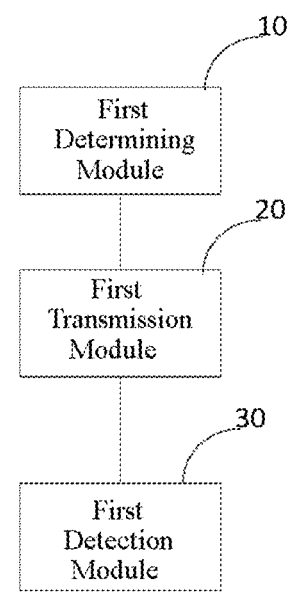
FIG. 6 shows a block diagram for a data transmission device according to an embodiment of the present disclosure.

Referring to FIG. 6, it shows a block diagram for a data transmission device according to an embodiment of the present disclosure.

The data transmission device is applicable to a terminal, as shown in FIG. 6, the device comprising:

a first determining module 10, configured to determine, according to resource configuration information, a preamble sequence, a physical random access channel PRACH time-frequency resource, a physical uplink shared channel PUSCH time-frequency resource set, and a mapping relationship between the preamble sequence and PUSCH time-frequency resources in the PUSCH time-frequency resource set;

a first transmission module 20, connected to the first determining module 10, and configured to transmit the preamble sequence by using the PRACH time-frequency resource, and transmit data by using a PUSCH time-frequency resource determined from the preamble sequence and the mapping relationship; and a first detection module 30, connected to the first transmission module 20 and configured to detect a random access response message MsgB in a random access response window.

With the aforementioned devices, the present disclosure can, after obtaining resource configuration information from the base station, parse the resource configuration information, thereby determining, according to the parsed information, the preamble sequence used by the terminal for the random access, PRACH time-frequency resources for sending the preamble sequences, a PUSCH time-frequency resource set for sending data, and mapping relationships between preamble sequences in the preamble sequence set and PUSCH time-frequency resources in the PUSCH time-frequency resource set. Moreover, the present disclosure can determine the PUSCH time-frequency resources for sending data according to the preamble sequences determined by the terminal and the mapping relationships, then send the preamble sequences by using the determined PRACH time-frequency resources while sending the data by using the PUSCH time-frequency resources, and detect the random access response message MsgB from the base station in the random access response window. The present disclosure may send the preamble sequences and the data at the same time, and afterwards detect and receive the random access response message MsgB from the base station, such that the terminal may interact with the base station in two steps to achieve random access with reduced latency. Besides, depending upon the mapping relationships between the preamble sequences and the PUSCH time-frequency resources, the base station can acquire the PUSCH time-frequency resources for sending data by the terminal according to the received preamble sequences and the mapping relationships, and acquire the information sent from the terminal by using the PUSCH time-frequency resources. In this manner, the number of interactions between the terminal and the base station is reduced.

Of note, the data transmission device is a device corresponding to said data transmission method, the details of which are described with reference to the aforementioned description of the data transmission method. For example, as to the resource configuration information, reference may be made to the resource configuration information described in the data transmission method, which will not be repeated here.

Figure 7:
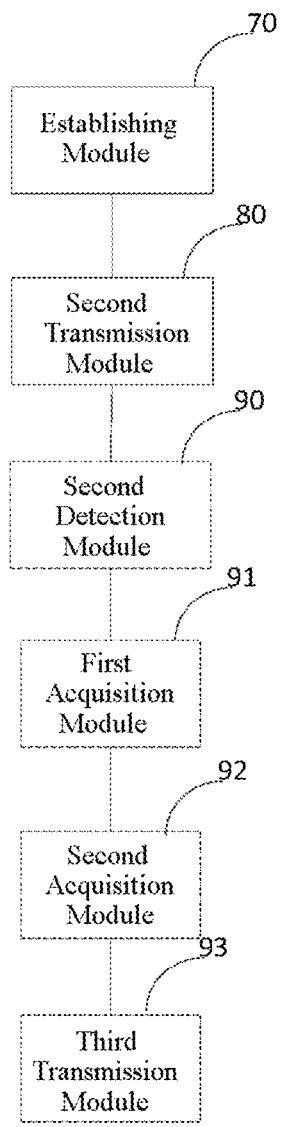
FIG. 7 shows a block diagram for a data transmission device according to an embodiment of the present disclosure.

Referring to FIG. 7, it shows a block diagram for a data transmission device according to an embodiment of the present disclosure.

The device, which is applicable to a base station, comprises:

an establishing module 70, configured to establish resource configuration information including at least one of preamble sequences, physical random access channel PRACH time-frequency resources, a physical uplink shared channel PUSCH time-frequency resource set, or a mapping relationship between the preamble sequences and PUSCH time-frequency resources in the PUSCH time-frequency resource set, the resource configuration information configured to allocate transmission resources; and a second transmission module 80, connected to the establishing module and configured to send the resource configuration information.

With the above-mentioned device, the present disclosure can establish resource configuration information, and send the resource configuration information to the terminal. The resource configuration information includes transmission resources for the terminal to transmit data. Based on the resource configuration information, the terminal can select transmission resources for random access, and send preamble sequences and data.

In a possible embodiment, the device may further comprise:

a second detection module 90, configured to detect PRACH time-frequency resources in a physical random channel, and acquire preamble sequences in the PRACH time-frequency resources;

a first acquisition module 91, connected to the second detection module 90 and configured to acquire PUSCH time-frequency resources corresponding to the preamble sequences according to the mapping relationship;

a second acquisition module 92, connected to the first acquisition module 91 and configured to acquire data in the PUSCH time-frequency resources; and a third transmission module 93, connected to the second acquisition module 92 and configured to send a random access response message MsgB in a random access response window after receiving the preamble sequences and the data in the PUSCH time-frequency resources.

Of note, the data transmission device is a device corresponding to the data transmission method, the details of which are described with reference to the aforementioned description of the data transmission method. For example, as to the resource configuration information, reference may be made to the resource configuration information described in the data transmission method, which will not be repeated here.

Figure 8:
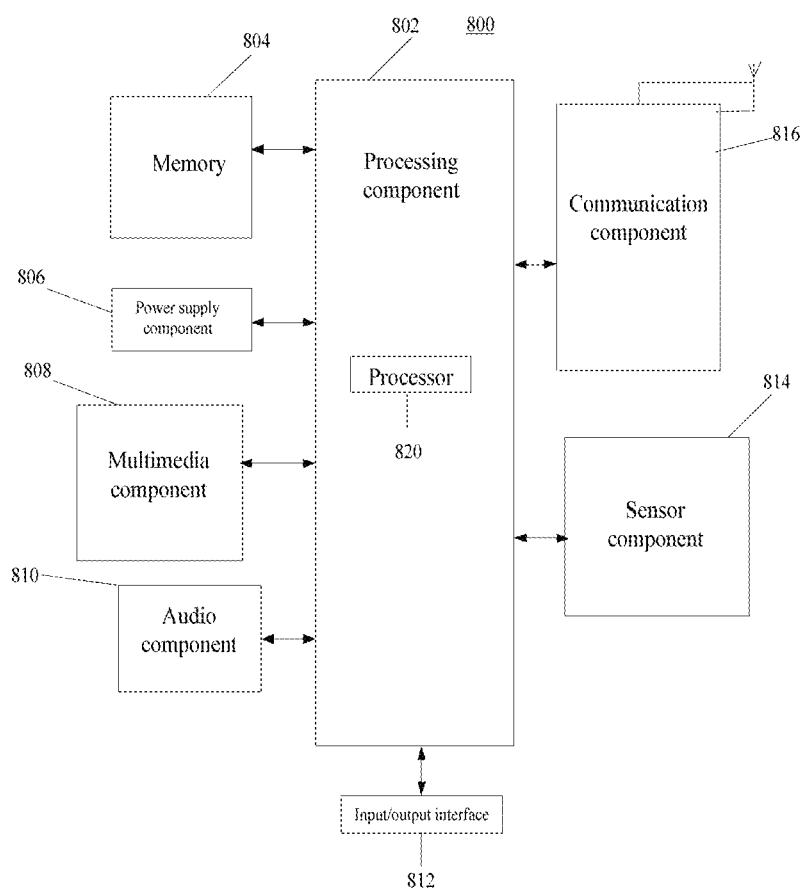
FIG. 8 shows a block diagram for a data transmission device according to an embodiment of the present disclosure.

Referring to FIG. 8, it shows a block diagram for a data transmission device according to an embodiment of the present disclosure. For example, the device 800 may be a mobile phone, a computer, a digital broadcasting terminal, a message transceiving apparatus, a game console, a tablet apparatus, a medical equipment, a fitness equipment, a personal digital assistant, etc.

Referring to FIG. 8, the device 800 may include one or more components of: a processing component 802, a memory 804, a power supply component 806, a multimedia component 808, an audio component 810, an Input/Output (I/O) interface 812, a sensor component 814, and a communication component 816.

The processing component 802 is configured usually to control overall operations of the device 800, such as the operations associated with display, telephone calls, data communications, camera operations, and recording operations. The processing component 802 can include one or more processors 820 configured to execute instructions to perform all or part of the steps included in the above-described methods. In addition, the processing component 802 may include one or more modules configured to facilitate the interaction between the processing component 802 and other components. For example, the processing component 802 may include a multimedia module configured to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory apparatus, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 806 is configured to provide power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors configured to sense touches, swipes, and gestures on the touch panel. The touch sensors may sense not only a boundary of a touch or swipe action, but also a period of time and a pressure associated with the touch or swipe action. In some embodiments, the multimedia component 808 may include a front camera and/or a rear camera. The front camera and/or the rear camera may receive an external multimedia datum while the device 800 is in an operation mode, such as a photographing mode or a video mode. Each of the front camera and the rear camera may be a fixed optical lens system or may have focus and/or optical zoom capabilities.

The audio component 810 is configured to output and/or input audio signals. For example, the audio component 810 may include a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker configured to output audio signals.

The I/O interface 812 is configured to provide an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors configured to provide status assessments of various aspects of the device 800. For example, the sensor component 814 may detect an open/closed status of the device 800, relative positioning of components, e.g., the components being the display and the keypad of the device 800. The sensor component 814 may further detect a change of position of the device 800 or one component of the device 800, presence or absence of contact between the user and the device 800, location or acceleration/deceleration of the device 800, and a change of temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the device 800 and other apparatus. The device 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel In an exemplary embodiment, the communication component 816 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-volatile computer readable storage medium, for example, memory 804 including computer program instructions, which are executable by the processor 820 of the device 800, to complete the above-described methods.

The technical solution proposed in the present disclosure is applicable to 5G (fifth generation) communication systems, is also applicable to 4G or 3G communication systems, or is further applicable to various communication systems, such as 6G and 7G, evolved in the future.

The technical solution proposed in the present disclosure is also applicable to different network architectures, including but not limited to relay network architectures, double-linked architectures, and Vehicle-to-Everything architectures.

The 5G CN used in the present embodiments may also be referred to as new core, or 5G NewCore, or next generation core (NGC), or the like. The 5G-CN is independent of available core, such as evolved packet core (EPC).

The base station (BS) used in the present embodiments may also be referred to as base station equipment, which is a device arranged in a wireless access network to provide wireless communication functions. For example, in the 2G network, the equipment functioning as a base station includes a base transceiver station (BTS) and a base station controller (BSC); in the 3G network, the equipment functioning as a base station includes a NodeB and a radio network controller (RNC); in the 4G network, the equipment functioning as a base station includes an evolved NodeB (eNB); in the wireless local area networks (WLAN), the equipment functioning as a base station is an access point (AP); in the 5G New Radio (NR), the equipment functioning as a base station includes a next generation NodeB (gNB), equipment functioning as a base station in the future new communication systems, and so forth.

The terminal used in the present embodiments may refer to various forms of User Equipment (UE), an access terminal, a user unit, a user station, a Mobile Station (MS), a remote station, a remote terminal, a user terminal, terminal equipment, wireless communication equipment, a user agent, or a user device. The terminal apparatus may also be a cell phone, a cordless phone, a Session Initiation Protocol (SIP) phone, a Wireless Local Loop (WLL) station, a Personal Digital Assistant (PDA), a handheld apparatus with wireless communication functions, a computing apparatus, or other processing apparatuses connected to a wireless modem, an in-vehicle apparatus, a wearable apparatus, a terminal apparatus used in future 5G networks, or a terminal apparatus used in evolved Public Land Mobile Network (PLMN) in the future, etc. The present embodiments are not limited thereto.

The present embodiments define the one-way communication link from the access network to the terminal as the downlink, the data transmitted on the downlink as downlink data, and the direction in which the downlink data is transmitted as the downlink direction, while defining the one-way communication link from the terminal to the access network as the uplink, the data transmitted on the uplink as uplink data, and the direction in which the uplink data is transmitted as the uplink direction.

It should be understood that the term "and/or" used herein represents only an association relationship for describing associated objects, and represents three possible relationships. For example, A and/or B may represent the following three cases: A exists alone, both A and B exist, and B exists alone. In addition, the character "/" used herein indicates an "or" relationship between two associated objects.

The term "a plurality of" used in the present embodiments refers to two or more.

The first, second, etc. used in the present embodiments are only for illustrative purposes to distinguish the objects, but do not represent the order, nor do they indicate a particular limitation on the number of apparatus in the present embodiments, and thus cannot limit the present embodiments in any way.

The term "connection", "connecting", or "connected" used in the present embodiments refers to various connection methods, such as direct or indirect connection, to enable communications between apparatuses, but the present embodiments are not limited thereto.

The term "network" and the term "system" used in the present embodiments are the same, for example, a communication system is a communication network.

It should be understood that in the present embodiments, the serial numbers of the above-mentioned steps do not imply an order of execution. The order of execution of the steps should depend on the functions and inherent logics of the steps, but should not constitute any limitation on the process of implementing the present embodiments.

In the several embodiments provided in the present application, it should be understood that the methods, devices and systems disclosed herein can be implemented in other ways. For example, the above-described device embodiments are merely for illustrative purposes. For example, the units are divided only from a logic and functional perspective, but they can also be divided in other ways in practice. For example, a plurality of units or components may be combined or integrated into another system, or some features may be omitted or may not be executed. Besides, mutual coupling or direct coupling or communication connection shown or discussed may be direct coupling or communication connection via some interfaces, devices or units, or may be in electrical, mechanical, or other forms.

The units illustrated as separate components may or may not be physically separated. The components shown as units may or may not be physical units, i.e., they may be located in one place, or distributed to a plurality of network units. Some or all of the units may be selected as actually needed to fulfill the objective of the present embodiments.

In addition, the functional units described in the embodiments of the present disclosure may be integrated into a single processing unit, or each unit is physically independent, or two or more units are integrated into a unit. The above integrated units may be realized either in the form of hardware or in the form of hardware and software functional units.

The foregoing describes only specific embodiments of the present disclosure, but the scope of protection for the present disclosure is not limited thereto. Variations or substitutions within the technical scope disclosed herein that are readily conceivable to a person skilled in the art should all be encompassed in the scope of protection for the present disclosure. Therefore, the scope of protection for the present disclosure shall be subject to that for the claims.

Although the embodiments of the present disclosure have been described above, the foregoing descriptions are exemplary but not exhaustive, and the disclosed embodiments are not limiting. For a person skilled in the art, a number of modifications and variations are obvious without departing from the scope and spirit of the described embodiments. The terms used herein are intended to provide the best explanations on the principles of the embodiments, practical applications, or technical improvements to the technologies in the market, or to make the embodiments described herein understood to other persons skilled in the art.

What is claimed is:

1. A data transmission method applicable to a terminal, the method comprising:
    determining a preamble sequence, a physical random access channel PRACH time-frequency resource, a physical uplink shared channel PUSCH time-frequency resource set, and a mapping relationship between the preamble sequence and PUSCH time-frequency resources in the PUSCH time-frequency resource set, based on resource configuration information;
    transmitting the preamble sequence by using the PRACH time-frequency resource, and transmitting the data by using a PUSCH time-frequency resource determined from the preamble sequence and the mapping relationship; and
    detecting a random access response message MsgB in a random access response window.

2. The data transmission method according to claim 1, wherein the PUSCH time-frequency resource set includes a PUSCH time domain resource set and a PUSCH frequency domain resource set; and said determining, based on the resource configuration information, the preamble sequence, the physical random access channel PRACH time-frequency resource, the physical uplink shared channel PUSCH time-frequency resource set, and the mapping relationship between the preamble sequence and the PUSCH time-frequency resources in the PUSCH time-frequency resource set comprises:
    determining the PUSCH time domain resource set; and
    determining the PUSCH frequency domain resource set.

3. The data transmission method according to claim 2, wherein said determining the PUSCH time domain resource set comprises:
    determining a starting slot and a starting time domain symbol of the PUSCH time domain resource set; and
    determining an ending slot and an ending time domain symbol of the PUSCH time domain resource set.

4. The data transmission method according to claim 3, wherein said determining the starting slot and the starting time domain symbol of the PUSCH time domain resource set comprises:
    determining a slot where a last time domain symbol of time domain resources in the PRACH time-frequency resource is located as the starting slot, and determining a last time domain symbol of time domain resources in the PRACH time-frequency resource as the starting time domain symbol:
    or
    the resource configuration information includes a length of a PUSCH time domain resource and a number of consecutively occupied time domains, and said determining the starting slot and the starting time domain symbol of the PUSCH time domain resource set further comprises:
    determining a slot where a first time domain symbol of time domain resources in the PRACH time-frequency resource is located as the ending slot, and determining a first time domain symbol of time domain resources in the PRACH time-frequency resource as the ending time domain symbol; and
    determining the starting slot based on the length of the PUSCH time domain resources, the number of consecutively occupied time domains, and the ending slot; and determining the starting time domain symbol based on the length of the PUSCH time domain resources, the number of consecutively occupied time domains of the PUSCH time domain resources, and the ending time domain symbol;
    or
    the resource configuration information includes a slot offset and a starting symbol index, and said determining the starting slot and the starting time domain symbol of the PUSCH time domain resource set further comprises:
    determining the starting slot of the PUSCH time domain resource based on the slot where a last time domain symbol of the time domain sources in the PRACH time-frequency resources is located and the slot offset, and determining the starting time domain symbol in the starting slot based on the starting symbol index;
    or
    the resource configuration information includes a starting symbol index, and said determining the starting slot and the starting time domain symbol of the PUSCH time domain resource set further comprises:

determining, as the starting slot, an uplink slot adjacent to a slot where a last time domain symbol of the time domain sources in the PRACH time-frequency resources is located, and determining the starting time domain symbol in the starting slot based on the starting symbol index;

or the resource configuration information includes a number of interval slots and a starting symbol index, and said determining the starting slot and the starting time domain symbol of the PUSCH time domain resource set further comprises:

determining, as the starting slot, a slot offset by the number of the interval slots from a slot where a last time domain symbol of the time domain sources in the PRACH time-frequency resources is located, and determining the starting time domain symbol in the starting slot based on the starting symbol index;

or the resource configuration information includes a starting symbol index, and said determining the starting slot and the starting time domain symbol of the PUSCH time domain resource set further comprises:

determining, as the starting slot, a slot where the ending time domain symbol of the PUSCH time domain resource set is located, the PUSCH time domain resource set corresponding to a preceding PRACH time domain source in the same slot, using the ending time domain symbol of the PUSCH time domain resource set as the starting time domain symbol, or determining the starting time domain symbol based on the starting symbol index and an ending symbol of the PUSCH time domain resource set;

or the resource configuration information further includes a PUSCH time domain resource length and a number of consecutively occupied time domains throughout the PUSCH time domain resource length, and said determining the ending slot and the ending time domain symbol of the PUSCH time domain resource set comprises:

determining the ending slot and the ending time domain symbol of the time domain resource set based on the starting slot, the starting time domain symbol, the PUSCH time domain resource length, and the number of consecutively occupied time domains throughout the PUSCH time domain resource length;

or the resource configuration information further includes at least one of a number of the preamble sequences, a length and a number of consecutively occupied frequency domains of the PUSCH frequency domain resource, or PUSCH time domain resource length, and said determining the ending slot and the ending time domain symbol of the PUSCH time domain resource set comprises:

determining the ending slot and the ending time domain symbol based on at least one of the number of the preamble sequences, the length and the number of consecutively occupied frequency domains of the PUSCH frequency domain resource, the PUSCH time domain resource length, or a mapping relationship between preamble sequences in a preamble sequence set and PUSCH time-frequency resources in the PUSCH time-frequency resource set.

5. The data transmission method according to claim 2, wherein said determining the PUSCH frequency domain resource set comprises:
   determining a starting position of the PUSCH frequency domain resource set; and
   determining an ending position of the PUSCH frequency domain resource set.

6. The data transmission method according to claim 5, wherein the resource configuration information includes a frequency domain offset and/or a frequency domain reference point, and said determining the starting position of the PUSCH frequency domain resource set comprises:
   determining the starting position of the PUSCH frequency domain resource set based on the frequency domain starting position, the frequency domain ending position, or the frequency domain reference point of the PRACH frequency domain resource set, along with the frequency domain offset.

7. The data transmission method according to claim 6, wherein said determining the starting position of the PUSCH frequency domain resource set comprises:
   determining the ending position of the PUSCH frequency domain resource set corresponding to a preceding adjacent frequency domain as a starting position of the adjacent PUSCH frequency domain resource set.

8. The data transmission method according to claim 5, wherein the resource configuration information includes at least one of a number of preamble sequences, a length of the PUSCH frequency domain resources, or a number of consecutively occupied time domains throughout the PUSCH time domain resource length, and said determining the ending position of the PUSCH frequency domain resource set comprises:
   determining the ending position of the PUSCH frequency domain resource set based on at least one of the starting position of the PUSCH frequency domain resource set, the number of the preamble sequences, the PUSCH frequency domain resource length, the number of consecutively occupied time domains throughout the PUSCH time domain resource length, or the mapping relationship.

9. The data transmission method according to claim 5, wherein the resource configuration information further includes a length of the PUSCH frequency domain resources, a number of consecutively occupied frequency domains throughout the PUSCH frequency domain resource length, and a number of the PRACH frequency domain resources, and said determining the ending position of the PUSCH frequency domain resource set comprises:
   determining an ending position of a total PUSCH frequency domain resource set comprising a plurality of the PUSCH frequency domain resource sets, based on the length of the PUSCH frequency domain resources and the number of consecutively occupied frequency domains throughout the length of the PUSCH frequency domain resources;

or wherein the resource configuration information includes at least one of a number of preamble sequences, a length of the PUSCH frequency domain resources, a length of the PUSCH time domain resources, or a number of consecutively occupied time domains, and said determining the ending position of the PUSCH frequency domain resource set comprises:
   determining an ending position of a total PUSCH frequency domain resource set comprising a plurality of the PUSCH frequency domain resource sets, based on the number of the PRACH frequency domain resources and at least one of the starting position of the PUSCH frequency domain resource set, the number of the preamble sequences, the PUSCH frequency domain resource length, the PUSCH time domain resource length, the number of consecutively occupied time domains throughout the PUSCH time domain resource length, or the mapping relationship.

10. The data transmission method according to claim 2, wherein the resource configuration information further includes an association between a beam and the PRACH time-frequency resource, and said determining the PUSCH frequency domain resource set further comprises:
   determining the PRACH time-frequency resource based on a selected beam and the association; and
   determining the PUSCH frequency domain resource set based on the time-frequency resource and the mapping relationship.

11. The data transmission method according to claim 1, wherein the resource configuration information includes a preamble sequence set, and the mapping relationship comprises:
   a one-to-one mapping relationship between a preamble sequence in the preamble sequence set and a PUSCH time-frequency resource in the PUSCH time-frequency resource set; or a one-to-many mapping relationship between a preamble sequence in the preamble sequence set and a plurality of PUSCH time-frequency resources in the PUSCH time-frequency resource set; or
   a many-to-one mapping relationship between a plurality of preamble sequences in the preamble sequence set and a PUSCH time-frequency resource in the PUSCH time-frequency resource set.

12. The data transmission method according to claim 11, wherein the resource configuration information includes a mapping number parameter between preamble sequences and the PUSCH time-frequency resources, and further includes:
   a one-to-one mapping relationship between a preamble sequence in the preamble sequence set and a PUSCH time-frequency resource in the PUSCH time-frequency resource set, in a case where the mapping number is a first preset value; or
   a one-to-many mapping relationship between a preamble sequence in the preamble sequence set and a plurality of PUSCH time-frequency resources in the PUSCH time-frequency resource set, or a many-to-one mapping relationship between a plurality of preamble sequences in the preamble sequence set and a PUSCH time-frequency resource in the PUSCH time-frequency resource set, in a case where the mapping number is not the first preset value.

13. The data transmission method according to claim 11, wherein the mapping relationship further comprises:
   a mapping relationship between the preamble sequences in the preamble sequence set and the PUSCH time-frequency resources in the PUSCH time-frequency resource set, where a direction of time domain resources precedes over a direction of frequency domain resources; or
   a mapping relationship between the preamble sequences in the preamble sequence set and the PUSCH time-frequency resources in the PUSCH time-frequency resource set, where the direction of frequency domain resources precedes over the direction of time domain resources.

14. The data transmission method according to claim 1, wherein said transmitting the data by using the PUSCH time-frequency resource determined from the preamble sequence and the mapping relationship comprises:
   randomly choosing one of a plurality of PUSCH time-frequency resources to transmit the data, in a case where the mapping relationship indicates a one-to-many mapping relationship between the preamble sequence and the plurality of PUSCH time-frequency resources;
   or
   wherein the method further comprises:
   receiving a system message or dedicated radio resource control RRC signaling, the system message or the RRC signaling including the resource configuration information;
   or
   wherein the method further comprises:
   acquiring the resource configuration information via a row index of a predefined table;
   or
   wherein said detecting the random access response message MsgB in the random access response window comprises:
   starting the random access response window in a slot where a first available PDCCH detection resource after transmission of the preamble sequence and the data is located, and receiving the random access response message MsgB in the random access response window.

15. A data transmission method applicable to a base station, the method comprising:
   establishing resource configuration information including at least one of preamble sequences, physical random access channel PRACH time-frequency resources, a physical uplink shared channel PUSCH time-frequency resource set, and a mapping relationship between the preamble sequences and PUSCH time-frequency resources in the PUSCH time-frequency resource set, the resource configuration information configured to allocate transmission resources; and
   sending the resource configuration information.

16. The data transmission method according to claim 15, wherein the PUSCH time-frequency resource set includes a PUSCH time domain resource set and a PUSCH frequency domain resource set, and the resource configuration information includes at least one of a starting slot, a starting time domain symbol, slot offset, a starting symbol index, and a number of interval slots of the PUSCH time domain resource set, length and a number of consecutively occupied time domains of a PUSCH time domain resource corresponding to each preamble sequence, a number of preamble sequences in the preamble sequence set, length and a number of consecutively occupied frequency domains of the PUSCH frequency domain resource, a number of PRACH frequency domain resources, and the mapping relationship, and is configured to allocate the PUSCH time domain resource set and/or the PUSCH frequency domain resource set.

17. The data transmission method according to claim 15, wherein the mapping relationship comprises:
   a one-to-one mapping relationship between a preamble sequence in the preamble sequence set and a PUSCH time-frequency resource in the PUSCH time-frequency resource set; or a one-to-many mapping relationship between a preamble sequence in the preamble sequence set and a plurality of PUSCH time-frequency resources in the PUSCH time-frequency resource set; or a many-to-one mapping relationship between a plurality of preamble sequences in the preamble sequence set and a PUSCH time-frequency resource in the PUSCH time-frequency resource set.

18. The data transmission method according to claim 17, wherein the resource configuration information includes a mapping number parameter, and further includes:

a one-to-one mapping relationship between a preamble sequence in the preamble sequence set and a PUSCH time-frequency resource in the PUSCH time-frequency resource set, in a case where the mapping number is a first preset value; or a one-to-many mapping relationship between a preamble sequence in the preamble sequence set and a plurality of PUSCH time-frequency resources in the PUSCH time-frequency resource set, or a many-to-one mapping relationship between a plurality of preamble sequences in the preamble sequence set and a PUSCH time-frequency resource in the PUSCH time-frequency resource set, in a case where the mapping number is not the first preset value.

19. The data transmission method according to claim 18, wherein the PUSCH time-frequency resource set includes a time domain resource set and a frequency domain resource set, and the mapping relationship further comprises:

a mapping relationship between the preamble sequences in the preamble sequence set and the PUSCH time-frequency resources in the PUSCH time-frequency resource set, where a direction of time domain resources precedes over a direction of frequency domain resources;

or a mapping relationship between the preamble sequences in the preamble sequence set and the PUSCH time-frequency resources in the PUSCH time-frequency resource set, where a direction of frequency domain resources precedes over a direction of time domain resources.

20. The data transmission method according to claim 15, wherein sending the resource configuration information comprises:

sending a system message or dedicated radio resource control RRC signaling, the system message or the RRC signaling including the resource configuration information;

or wherein sending the resource configuration information further comprises:

sending the resource configuration information via a predefined table row index.

21. The data transmission method according to claim 15, wherein the method further comprises:

detecting PRACH time-frequency resources in a physical random access channel, and acquiring preamble sequences in the the PRACH time-frequency resources;

acquiring PUSCH time-frequency resources corresponding to the preamble sequences based on the mapping relationship; and acquiring data in the PUSCH time-frequency resources.

22. The data transmission method according to claim 21, wherein the method further comprises:

sending a random access response message MsgB in a random access response window after receiving the preamble sequences and the data in the PUSCH time-frequency resources.

23. A data transmission device comprising:

a process; and a memory configured to store instructions executable by the processor;

wherein the process is configured to:

execute the method of determining a preamble sequence, a physical random access channel PRACH time-frequency resource, a physical uplink shared channel PUSCH time-frequency resource set, and a mapping relationship between the preamble sequence and PUSCH time-frequency resources in the PUSCH time-frequency resource set, based on resource configuration information;

transmitting the preamble sequence by using the PRACH time-frequency resource, and transmitting the data by using a PUSCH time-frequency resource determined from the preamble sequence and the mapping relationship; and detecting a random access response message MsgB in a random access response window;

or execute the method of establishing resource configuration information including preamble sequences, physical random access channel PRACH time-frequency resources, a physical uplink shared channel PUSCH time-frequency resource set, and a mapping relationship between the preamble sequences and PUSCH time-frequency resources in the PUSCH time-frequency resource set, the resource configuration information configured to allocate transmission resources; and sending the resource configuration information.

* * * * *